United States Patent
Eidsmore

(10) Patent No.: US 12,195,275 B2
(45) Date of Patent: Jan. 14, 2025

(54) SYSTEM HAVING AUTOMATED LIFT ASSEMBLY AND PROCESS FOR LOADING AND UNLOADING CARGO FROM DELIVERY VEHICLE

(71) Applicant: Paul G. Eidsmore, Santa Cruz, CA (US)

(72) Inventor: Paul G. Eidsmore, Santa Cruz, CA (US)

(73) Assignee: MASTERHAUL LLC, Santa Cruz, CA (US)

( * ) Notice: Subject to any disclaimer, the term of this patent is extended or adjusted under 35 U.S.C. 154(b) by 276 days.

(21) Appl. No.: 17/608,560

(22) PCT Filed: May 4, 2020

(86) PCT No.: PCT/US2020/031323
§ 371 (c)(1),
(2) Date: Nov. 3, 2021

(87) PCT Pub. No.: WO2020/227215
PCT Pub. Date: Nov. 12, 2020

(65) Prior Publication Data
US 2022/0219900 A1   Jul. 14, 2022

Related U.S. Application Data

(60) Provisional application No. 62/842,899, filed on May 3, 2019.

(51) Int. Cl.
*B65G 1/06* (2006.01)
*B60P 1/44* (2006.01)

(52) U.S. Cl.
CPC ............. *B65G 1/06* (2013.01); *B60P 1/4435* (2013.01)

(58) Field of Classification Search
CPC ......... B65G 1/06; B65G 69/24; B60P 1/4435; B60P 1/4421; B60P 3/007; B60P 1/36; B66B 11/00
See application file for complete search history.

(56) References Cited

U.S. PATENT DOCUMENTS 2,635,771 A * 4/1953 Black .................... B60P 1/4421
414/540
3,747,782 A    7/1973 Brown
(Continued)

FOREIGN PATENT DOCUMENTS

CN          204821256         12/2015
DE    10 2017 003 815 A1     10/2017
(Continued)

OTHER PUBLICATIONS

Extended European Search Report, dated Jan. 2, 2023, in connection with European Application No. EP20802709.4.
(Continued)

*Primary Examiner* — Saul Rodriguez
*Assistant Examiner* — Lucia Elba Rodriguez
(74) *Attorney, Agent, or Firm* — Lippes Mathias LLP

(57) ABSTRACT

An autonomous cargo loading or unloading system for a delivery vehicle is disclosed. The system includes a storage compartment having at least a two high by two wide array of compartment portions that store associated cargo received from or delivered through an opening to the storage compartment. A conveyor is located in each compartment portion and the conveyor configured to assist in the delivery or receipt of the associated cargo from or into the compartment portion. A lift assembly is movably mounted to the storage compartment and configured to receive associated cargo from a compartment portion, the lift assembly including a lift assembly conveyor that receives associated cargo from or delivers associated cargo to a compartment portion. The (Continued)

platform can move vertically up and down, and side to side relative to the storage compartment.

32 Claims, 28 Drawing Sheets

(56) References Cited

U.S. PATENT DOCUMENTS

| | | | |
|---|---|---|---|
| 4,930,969 | A | 6/1990 | Langer |
| 5,054,295 | A | 10/1991 | Goulooze |
| 5,868,544 | A | 2/1999 | Cox |
| 6,622,846 | B1 | 9/2003 | Dean |
| 6,929,440 | B1 | 8/2005 | Grond |
| 9,028,195 | B1 | 5/2015 | Heynssens |
| 9,630,545 | B1 | 4/2017 | Corrigan et al. |
| 10,179,711 | B1 | 1/2019 | Moore |
| 2004/0115034 | A1 | 6/2004 | Arijoki |
| 2007/0297879 | A1 | 12/2007 | Yuyama et al. |
| 2010/0236490 | A1 | 9/2010 | Sebastia |
| 2012/0177467 | A1* | 7/2012 | Corrigan ............... B60P 1/6427 414/352 |
| 2014/0186149 | A1* | 7/2014 | Campbell ............ B65G 63/002 211/49.1 |
| 2014/0261098 | A1 | 9/2014 | Giemza et al. |
| 2015/0003944 | A1 | 1/2015 | Eidsmore |
| 2016/0107559 | A1 | 4/2016 | Russo et al. |
| 2016/0340111 | A1* | 11/2016 | DiSorbo .............. B65D 88/129 |
| 2017/0327346 | A1 | 11/2017 | Löser et al. |
| 2018/0072211 | A1 | 3/2018 | Kato et al. |
| 2018/0079601 | A1 | 3/2018 | Khong et al. |
| 2018/0282061 | A1 | 10/2018 | Orth et al. |
| 2020/0010015 | A1* | 1/2020 | Pettey ...................... B60R 1/00 |
| 2020/0223348 | A1* | 7/2020 | Toth ...................... B60P 1/4428 |
| 2021/0053780 | A1 | 2/2021 | Eidsmore |

FOREIGN PATENT DOCUMENTS

| | | |
|---|---|---|
| DE | 102017003815 | 10/2017 |
| EP | 1775246 A1 | 4/2007 |
| KR | 1999 0030497 | 4/1999 |
| RU | 2644215 | 2/2018 |

OTHER PUBLICATIONS

PCT/US2020/031323, International Search Report and Written Opinion, Jul. 13, 2020.

Office Action, dated Oct. 11, 2023, issued in connection with corresponding Russian Application No. 2021133422.

Search report, dated Jun. 25, 2023, issued in connection with corresponding Russian Application No. 2021133422.

Extended European Search Report for Application No. 20802709.4, dated Jan. 2, 2023.

Notice of Allowance with Search Report for Chinese Application No. 202080048777.9, dated Apr. 25, 2024 (English translation of p. 1).

Notice of Reasons for Rejection for Japanese Application No. 2021-565756 mailed Feb. 16, 2024.

Examination Report (Bi-lingual including English) for India Application No. 202117053642, dated Mar. 19, 2024.

* cited by examiner

SYSTEM HAVING AUTOMATED LIFT ASSEMBLY AND PROCESS FOR LOADING AND UNLOADING CARGO FROM DELIVERY VEHICLE

This application claims the priority benefit of U.S. provisional application Ser. No. 62/842,899, filed May 3, 2019, the entire disclosure of which is incorporated herein by reference.

BACKGROUND

This invention relates to a system incorporated as a part of an associated delivery vehicle, or as a retrofit to an existing associated delivery vehicle. The system includes an automated lift assembly and the system defines a process for unloading cargo from the associated delivery vehicle, although it will be appreciated that the system and process can also be used to transport and/or load cargo into the delivery vehicle.

Delivery vehicles are well known in the art. For example, panel vans, cargo trucks, and trailers of a tractor-trailer are all used for delivering cargo from one site to another. As noted above, the present invention can be included as part of the original delivery vehicle or may be provided as a retrofit option for converting the delivery vehicle to an automated/autonomous lift assembly. The vehicle itself could be autonomous or one that requires a driver.

There has been a rapid increase in the need for delivery vehicles in connection with the delivery of goods (generally referred to herein as cargo or cargo items, but which can relate to a wide variety of goods, containers, packages, boxes, etc.). It is believed that over time more of these vehicles will be autonomous or semi-autonomous (reduced human labor or interaction required for loading, unloading, and transporting cargo) and may provide for driverless delivery vehicles that will pick up cargo from a first site (e.g., plant, warehouse, post office, etc.) and transport the cargo to a second site (e.g., post office, delivery hub or intermediate warehouse, business, residence, etc.). It is also contemplated that a delivery vehicle would carry a variety of cargo, that is, the cargo may not all be the same items, or even the same types of items, sizes, weights, etc. Therefore, the cargo compartment of the delivery vehicle will likely be one with multiple compartment portions.

The cargo compartment preferably includes a door that selectively allows access to the compartment and thereby allows additional cargo to be added to one or more of the compartment portions, or removal of cargo previously arranged in the compartment portions. As cargo is added to or from the compartment along a designated route, it may also become necessary to re-orient the cargo in the different compartment portions. For example, cargo originally stored in one compartment portion may be rearranged along the delivery route, for example where some cargo becomes less accessible and cargo that has been picked up or re-arranged along the route needs to be rearranged to complete a delivery at a desired site.

Thus, a need exists for an improved system, process and arrangement that provides at least one or more of the above-described features, overcomes one or more noted deficiencies, as well as providing still other features and benefits.

SUMMARY

An autonomous cargo loading or unloading system is provided for an associated delivery vehicle.

The system preferably includes a storage compartment of the associated vehicle that stores associated cargo in at least one compartment portion where the cargo is received from or delivered through an opening to the storage compartment. A conveyor is located in each compartment portion and configured to assist in the delivery or receipt of the associated cargo from or into the compartment portion. A lift assembly is movably mounted to the storage compartment and configured to receive associated cargo from a compartment portion. The lift assembly includes a lift assembly conveyor that receives associated cargo from or delivers associated cargo to a compartment portion.

The storage compartment may be divided into multiple compartment portions such as at least a two high by two wide (2×2) array of compartment portions.

The lift assembly includes a platform that receives associated cargo from or delivers associated cargo to one of the compartment portions.

A preferred mounting assembly movably secures the lift assembly to the storage compartment, the mounting assembly including first and second vertical guide members positioned at horizontally spaced locations of the storage compartment. First and second horizontal guide members are provided at vertically spaced locations, and each horizontal guide member includes first and second ends that are interconnected to the vertical guide members and movable vertically relative thereto. The platform is preferably secured to the first and second horizontal guide members and movable therealong between the first and second vertical guide members whereby the platform can be positioned at a selected compartment portion of the array.

The platform in a first embodiment has a first edge pivotally mounted to the second horizontal guide member whereby the platform is movable between a first, vertical, or storage position and a second, horizontal, or deployed position.

At least one linkage assembly includes first and second links, a first end of the first link secured to the first horizontal guide member and a first end of the second link secured to a second edge of the platform, and second ends of the first and second links hingedly connected to one another.

It is desirable that the platform is movably mounted to the first and second horizontal members so that the platform can move laterally relative to the compartment portions.

It is also desirable that the platform is movably mounted to the first and second vertical members so that the platform can move vertically relative to the compartment portions.

The mounting assembly may be dimensioned so that the platform can move to a horizontal location below the compartment portions.

The platform in one arrangement includes a lift assembly conveyor operatively associated with the platform.

In a preferred arrangement, the lift assembly conveyor includes first and second conveyor portions separated by a gap, and at least one pusher bar that extends through the gap and is configured to engage the associated cargo received on the platform and facilitate movement of a first associated cargo component relative to an adjacent, second associated cargo component.

The pusher bar is mounted for movement with the first and second conveyor portions.

In one embodiment, the pusher bar is weighted and mounted to the platform whereby the pusher bar extends through the gap and extends above a surface of the first and second conveyor portions as the pusher bar traverses the lift platform from a first edge to a second edge, and is located below the surface as the pusher bar traverses the lift platform from the second edge to the first edge.

A sensor may be provided for monitoring movement of the associated cargo from the compartment portion conveyor to the lift assembly conveyor.

The system in one arrangement includes a first motor operatively associated with the conveyor of at least one of the compartment portions, a second motor operatively associated with the lift assembly conveyor, and a controller. The controller communicates with the lift assembly, the mounting assembly, the sensor, the first motor, and the second motor to deploy and store the platform, move the platform among the compartment portions and below the compartment portions, monitor a position of a first associated cargo component and in response controlling relative speeds of the conveyors of the compartment portion and the lift assembly conveyor to transfer the first associated cargo on to the lift assembly conveyor.

A process for loading or unloading associated cargo to or from an associated delivery vehicle is also provided.

The delivery vehicle includes a storage compartment system having compartment portions dimensioned to receive cargo therein, a first motor operatively associated with a conveyor of at least one of the compartment portions, a lift assembly having a platform with a lift assembly conveyor where the lift assembly is secured via a mounting assembly to the storage compartment system, a sensor, a second motor operatively associated with the lift assembly conveyor, and a controller. The controller communicates with the lift assembly, the mounting assembly, the sensor, the first motor operatively associated with the compartment portions and a second motor operatively associated with the lift assembly conveyor, and the second motor to deploy and store the platform, move the platform among the compartment portions, and transfer the associated cargo from a compartment portion to the platform, and/or to a ground surface.

The transferring step includes moving the associated cargo from the compartment portions to the ground surface at a location below the compartment portions, e.g., the ground surface.

The process may include sensing a position of the associated cargo during the transferring step and operating the compartment portion conveyor and the lift assembly conveyor to separate associated first and second cargo items.

The moving step includes raising and lowering the platform between vertically offset compartment portions, and/or laterally moving the platform between horizontally offset compartment portions.

The process further includes moving the platform between a storage position and a deployed position.

The platform moving step includes pivoting the platform between a vertical orientation that defines the storage position and a horizontal orientation that defines the deployed position.

The storage compartment system further includes a door, and the process further includes opening and closing the door to selectively access the storage compartment.

An alternative storage compartment system may include a pair of support rails with rollers that allow cargo to roll in or out of the cargo compartment or compartment portions rather than using conveyors.

Fences may be associated with flexible drive members (e.g., chains, cables, or belts) to push cargo in or out of the compartment or compartment portions.

First and second motors that drive first and second fences can be monitored and advantageously used to squeeze or apply a longitudinal compression force on adjacent disposed cargo items received between the first and second fences.

The rear (e.g., second) fence may also be automatically moved from a vertical, cargo pushing position to a horizontal, bridging position where the fence acts as an extension to bridge or transfer the cargo from the rollers of the storage compartment system to the platform.

Selectively using the rear fence as a bridge allows a gap between the lift assembly and the storage compartment system to accommodate the movable door that allows selective access to the compartment.

A first advantage of the present disclosure is the ability to provide a lift assembly that has a platform that travels vertically upward and downward, and laterally side to side relative to the storage compartment.

Another benefit resides in the use of integrated conveyors associated with compartment portions, and with the lift platform for moving cargo to/from the delivery vehicle.

Yet another advantage is associated with the controller that provides for autonomous operation of loading and unloading cargo from a delivery vehicle, repositioning cargo in separate compartment portions of the vehicle, and positions cargo at different locations along the ground surface as needed.

Software monitors current draw associated with the first and second motors that drive the first and second fences, respectively, in order to determine that a squeezing or compression force is imposed on the cargo items between the fences.

The squeezing, compression force on the cargo can be used to ideally position the cargo within the compartment, and/or stabilize the cargo as the vehicle accelerates and decelerates during vehicle operation.

Still other benefits and advantages of the present disclosure will become more apparent from reading and understanding the following detailed description.

DETAILED DESCRIPTION

Figure 1:
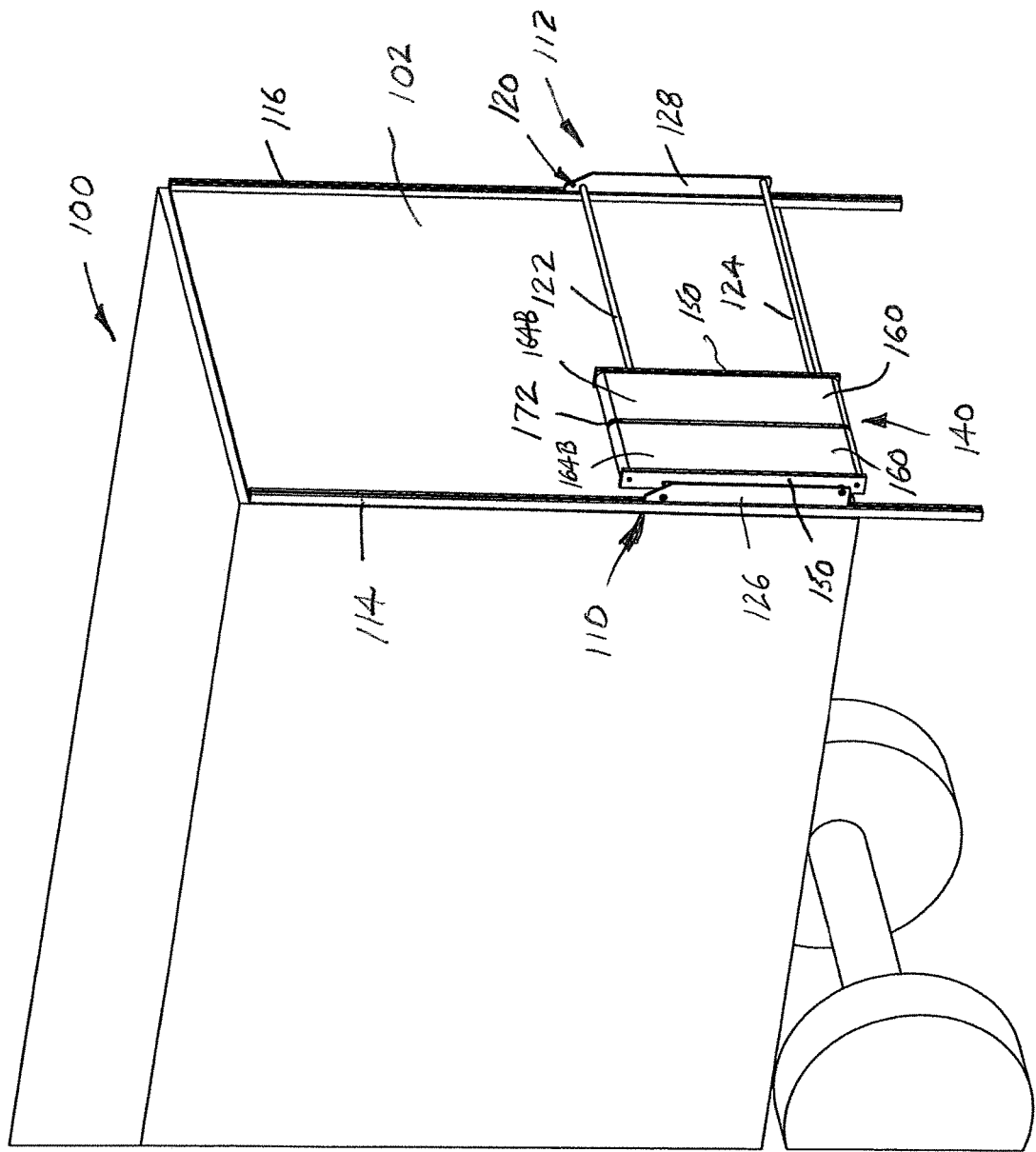
FIGS. 1-23 are a series of illustrations showing unloading (and loading or temporarily storing for transport) cargo (products, boxes, containers, with or without pallets, etc.) from an associated wheeled delivery vehicle.

The following description with reference to the accompanying drawings is provided to assist in a comprehensive understanding of one or more embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. Various exemplary embodiments of the present disclosure are not limited to the specific details of different embodiments and should be construed as including all changes and/or equivalents or substitutes included in the ideas and technological scope of the appended claims. In describing the drawings, where possible similar reference numerals are used for similar elements.

The terms "include" or "may include" used in the present disclosure indicate the presence of disclosed corresponding functions, operations, elements, and the like, and do not limit additional one or more functions, operations, elements, and the like. In addition, it should be understood that the terms "include", "including", "have" or "having" used in the present disclosure are to indicate the presence of components, features, numbers, steps, operations, elements, parts, or a combination thereof described in the specification, and do not preclude the presence or addition of one or more other features, numbers, steps, operations, elements, parts, or a combination thereof.

The terms "or" or "at least one of A or/and B" used in the present disclosure include any and all combinations of words enumerated with them. For example, "A or B" or "at least one of A or/and B" mean including A, including B, or including both A and B.

Although the terms such as "first" and "second" used in the present disclosure may modify various elements of the different exemplary embodiments, these terms do not limit the corresponding elements. For example, these terms do not limit an order and/or importance of the corresponding elements, nor do these terms preclude additional elements (e.g., second, third, etc.) The terms may be used to distinguish one element from another element. For example, a first mechanical device and a second mechanical device all indicate mechanical devices and may indicate different types of mechanical devices or the same type of mechanical device. For example, a first element may be named a second element without departing from the scope of the various exemplary embodiments of the present disclosure, and similarly, a second element may be named a first element.

It will be understood that, when an element is mentioned as being "connected" or "coupled" to another element, the element may be directly connected or coupled to another element, and there may be an intervening element between the element and another element. To the contrary, it will be understood that, when an element is mentioned as being "directly connected" or "directly coupled" to another element, there is no intervening element between the element and another element.

The terms used in the various exemplary embodiments of the present disclosure are for the purpose of describing specific exemplary embodiments only and are not intended to limit various exemplary embodiments of the present disclosure. As used herein, the singular forms are intended to include the plural forms as well, unless the context clearly indicates otherwise.

All of the terms used herein including technical or scientific terms have the same meanings as those generally understood by an ordinary skilled person in the related art unless they are defined otherwise. The terms defined in a generally used dictionary should be interpreted as having the same meanings as the contextual meanings of the relevant technology and should not be interpreted as having inconsistent or exaggerated meanings unless they are clearly defined in the various exemplary embodiments.

FIG. 1 shows a back end or rear end of a wheeled delivery vehicle 100 such as a cargo van, box truck, trailer, etc. or a storage container pod that may be selectively mounted to or remove from a vehicle, that has a door 102 to provide access to an internal cargo compartment 104. In the illustrated embodiment, the door 102 is an overhead door such as a garage-type door having a series of panels each supported along opposite edges by rollers that are received in generally c-shaped tracks. Particular details of the door are not illustrated since the structure and operation of such an overhead door is well known and understood by those skilled in the art so that further description is unnecessary to a full and complete understanding of the present disclosure. Further, illustration of this type of door 102 does not preclude use of other types of doors and instead is representative of the ability to open and close access to the cargo compartment 104 of the vehicle 100.

Attached (e.g., added or retrofit) to a rear end of the vehicle 100, or integrated as a part of the original vehicle, is an automated lift gate or lift assembly 110. The lift assembly 110 is joined via a mounting assembly 112 to the cargo compartment 104 of the vehicle 100. The mounting assembly 112 includes first and second vertically extending tracks or channels 114, 116 that are located along laterally outer edges at the rear of the cargo compartment 104. As shown in the figures, the channels 114, 116 may extend a greater vertical extent than the storage compartment 104 and particularly, in this instance, the channels extend outwardly from a lower edge of the opening or access to the cargo compartment 104. Although the channels 114, 116 are shown as static components that always extend below a lower level of the cargo compartment, it is also contemplated that the channels could terminate at the base of the cargo compartment, and include extendible/retractable or telescoping portions that provide an extended length to the channels, thus allowing the channels to collapse or reduce in length when not in use during loading or unloading of cargo. In a preferred arrangement, the mounting assembly 112 includes a generally rectangular frame 120 having a first or upper horizontal member 122 and a vertically spaced, second or lower horizontal member 124. In addition, the frame 120 includes first and second vertical members 126, 128 that are joined to the opposite ends of the first and second horizontal members 122, 124.

In one preferred embodiment, portions of the mounting assembly 112, and specifically the channels 114, 116 and frame 120, support the lift assembly 110 for movement relative to the cargo compartment 104. More particularly, the lift assembly 110 includes a platform 140 joined to the frame 120, and the platform is either made as a part of or mounted onto the vehicle 100 at the open end of the cargo compartment 104. Particularly, the frame 120 and platform 140 move relative to the cargo compartment 104 in a manner that will be described further below. In one preferred version, the platform 140 is preferably pivotally or hingedly mounted along a first edge to the frame 120, specifically to the lower horizontal member 124. The frame 120, in turn, is movable relative to the cargo compartment 104. Generally, however, the frame 120 is intended for selective vertical movement where the vertical extent of the movement is at least a dimension that generally matches the height of the door 102 and thereby provides access to the entire cargo compartment 104. In addition, the frame 120 is preferably capable of moving vertically downward so that the second, or lower, horizontal member 128 of the frame and the platform 140 that is pivotally attached thereto is located for example adjacent the ground surface below the rear end of the vehicle 100.

Figure 16:
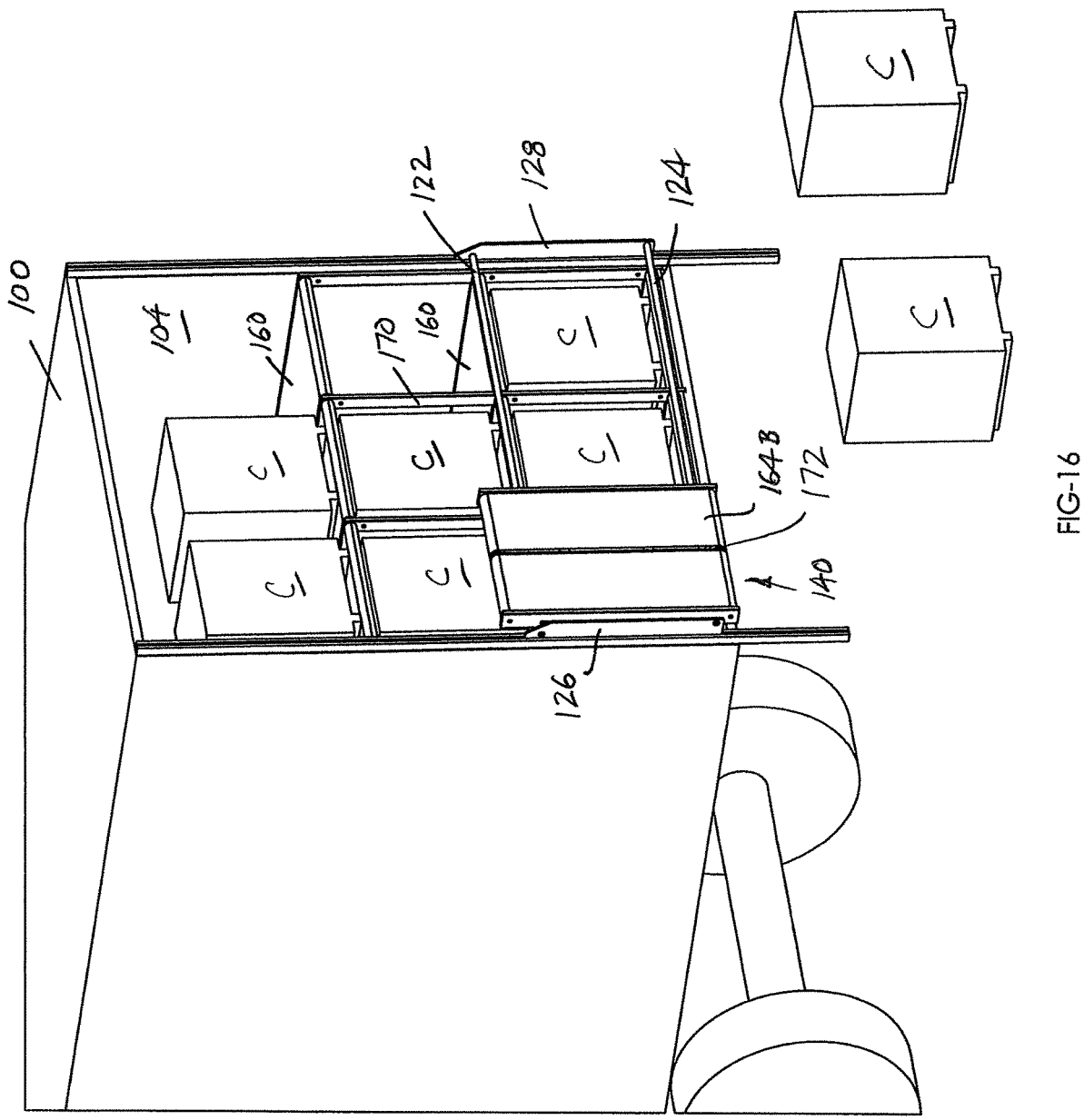

As noted above, the platform 140 is mounted to the frame, specifically the second horizontal member 124, for example, such that the platform can pivot between a stored, vertically upright position (FIGS. 1, 16, and 17) and an operative, horizontal position (FIGS. 2-14). First and second arms 142, 144 (FIGS. 2-3) extend between a second edge of the platform 112 and the first or upper horizontal number 122. In the illustrated embodiment, each arm 142, 144 is a two-bar linkage where a first link arm portion 142*a* (142*b*) is rotatably joined to a second link arm portion 144*a* (144*b*) via a pin connection 146 that allows selective rotating or pivoting action about the pin between the first link arm portion and the second link arm portion. Each first link arm portion 142*a*, 142*b* is rotatably joined at a first end to the first or upper horizontal member 122 of the frame 120. Each second link arm portion 144*a*, 144*b* has a first end rotatably joined to a respective first link arm portion 142*a*, 142*b* via the pins 146*a*, 146*b*, respectively. Further, a second end of each second link arm portion 144*a*, 144*b* is rotatably joined to the platform 140, particularly rotatably joined to a side frame 150 of the platform 140.

Figure 2:
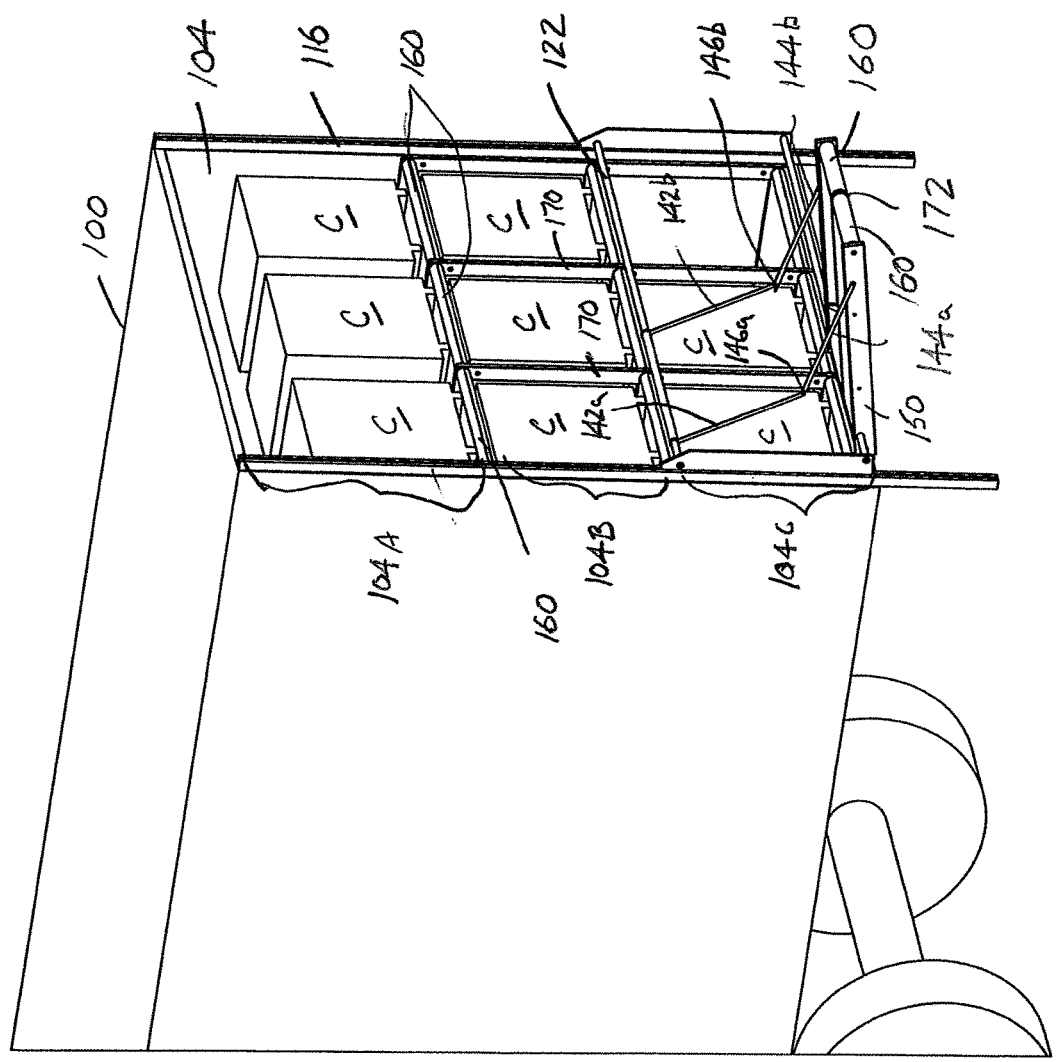

In a storage position (i.e., when the platform 140 is in the stored, vertically upright position), the first and second link arm portions 142*a*, 144*a* and 142*b*,144*b* overlap one another (FIG. 1). On the other hand, in a deployed position, i.e., when the platform 140 is in the operative, horizontal position (FIG. 3), the first and second link arm portions 142*a*, 144*a* are generally longitudinally aligned. FIG. 2 illustrates a transition position of the link arm portions 142*a*, 144*a* between the storage and deployed positions. A motor (e.g. electric, hydraulic, pneumatic, etc.) selectively moves the platform 140 between the stored and deployed positions.

Although in a preferred arrangement the platform 140 is stored in a vertical upright position as illustrated in FIG. 1, one skilled in the art will recognize that alternative storage locations and positions of the platform can be used without departing from the scope and intent of the present disclosure. Removal of the link arms 142, 144 and likely removal of the upper horizontal member 122 of the frame 120 eliminates the ability to have the link arms constrain movement of the cargo in a lateral direction, but would permit the platform 140 to be stored, for example, in a horizontal position beneath the storage compartment. In such an alternative arrangement, the platform 140 may be moved to a horizontal storage position either above or below the cargo compartment. Likewise, modifications can be made to accommodate storage of the platform 140 along a side of the cargo compartment 104, or even within the cargo compartment, although none of these alternatives is deemed to be as desirable as that shown in the accompanying drawings due to the ability to provide the lift assembly of the present disclosure as a retrofit option to an existing vehicle, as well as the ease with which the lift assembly 110 can be incorporated into an OEM vehicle construction.

Figure 3:
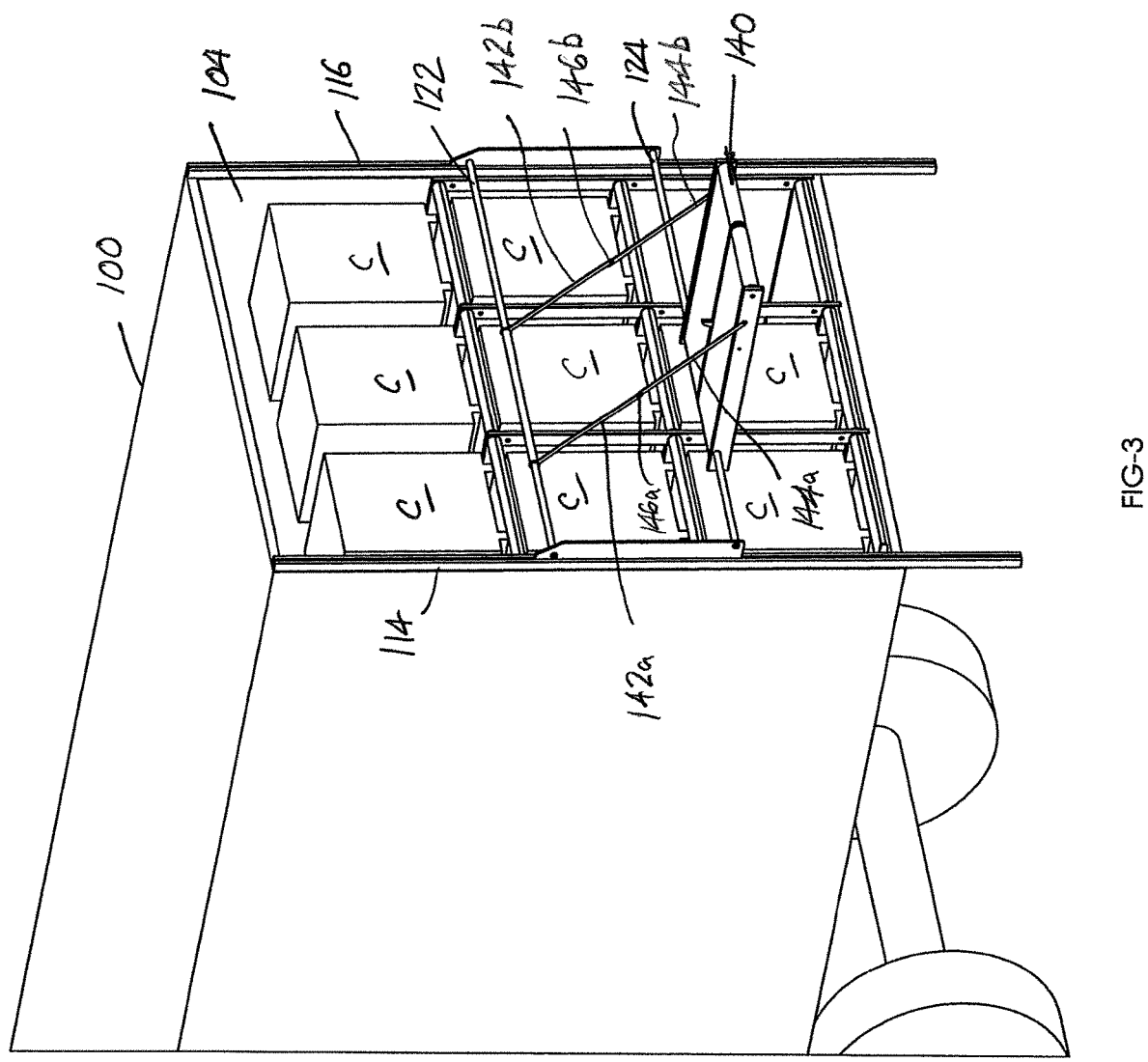
Figure 4:
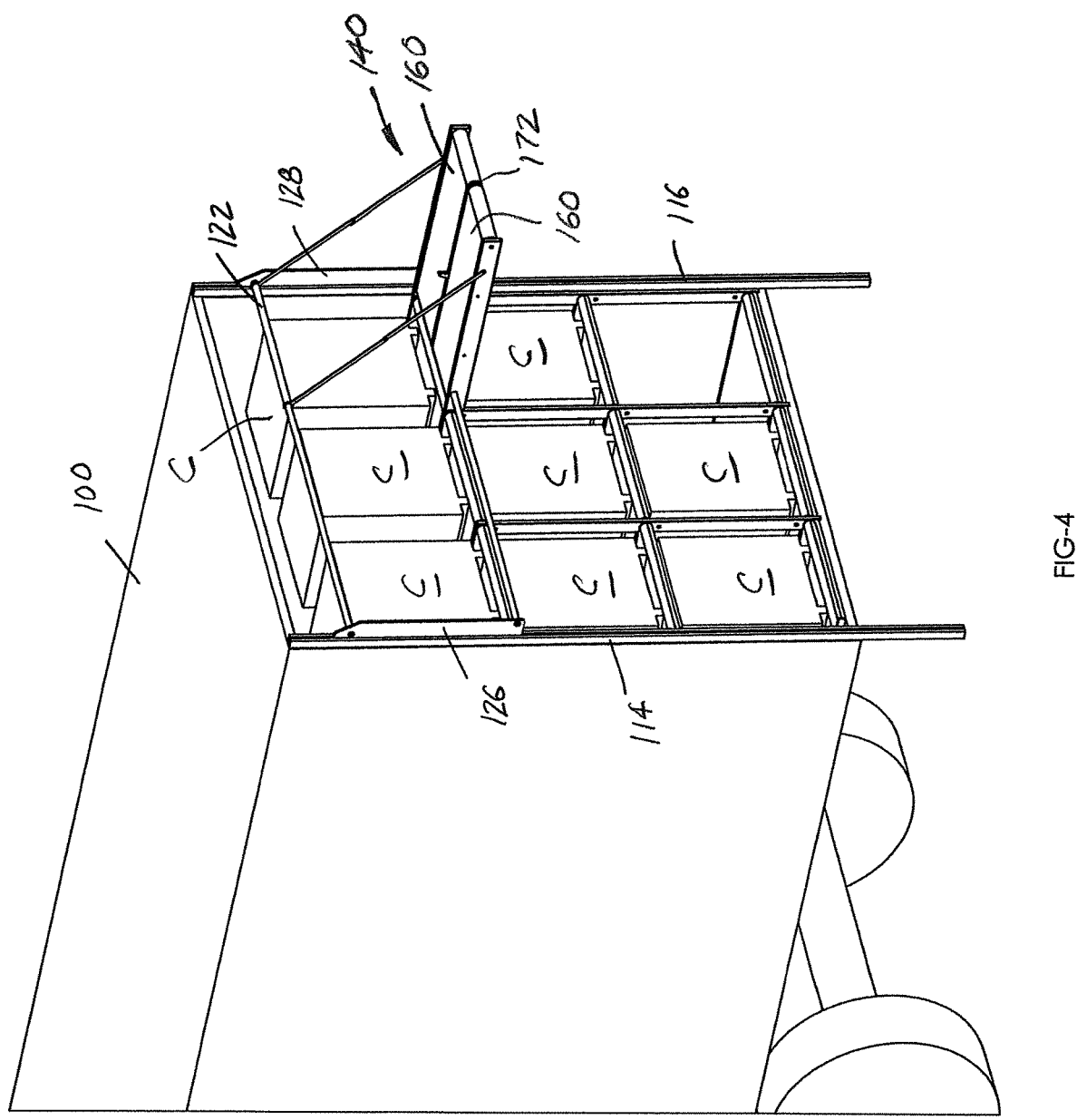
Figure 5:
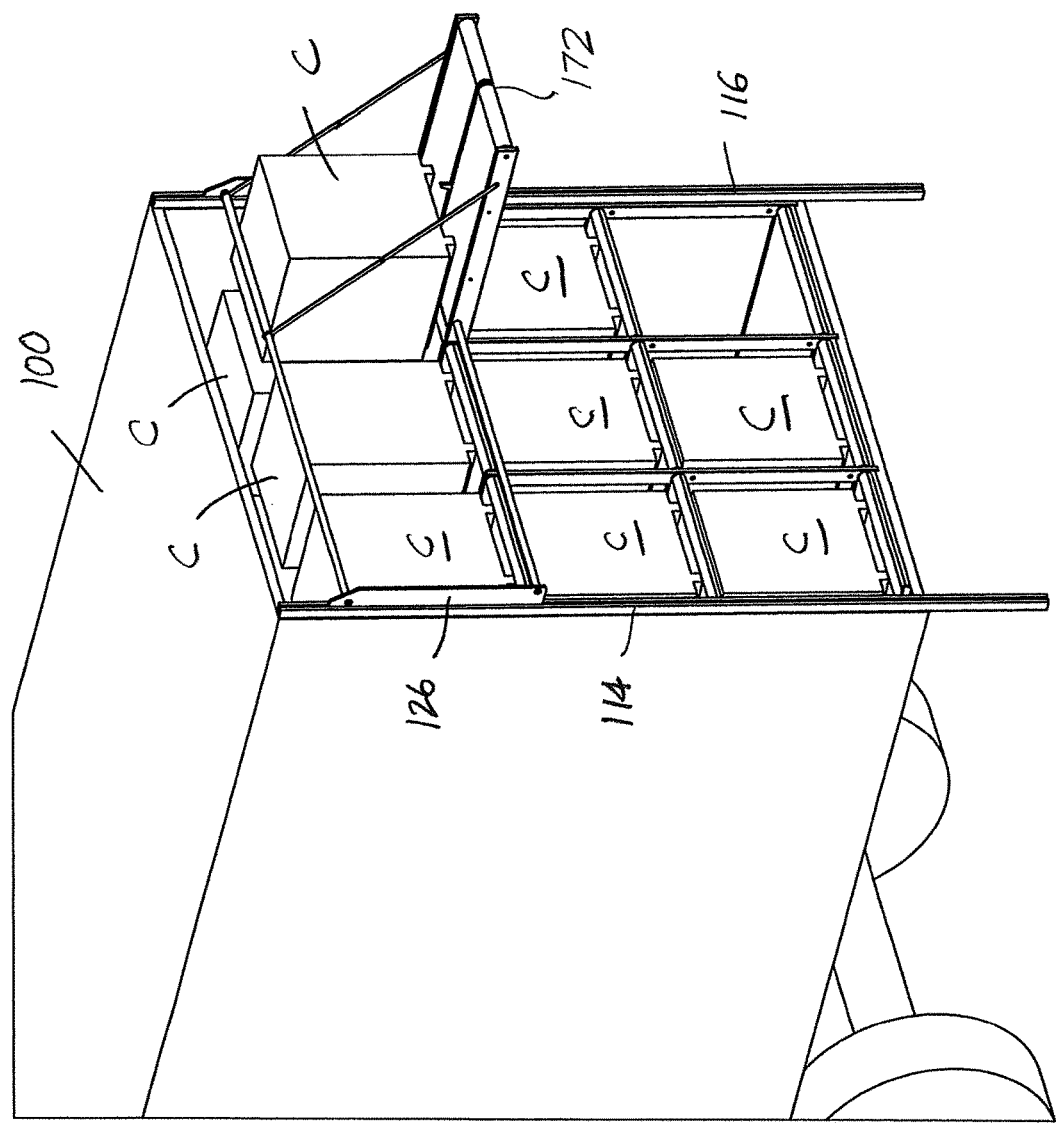
Figure 6:
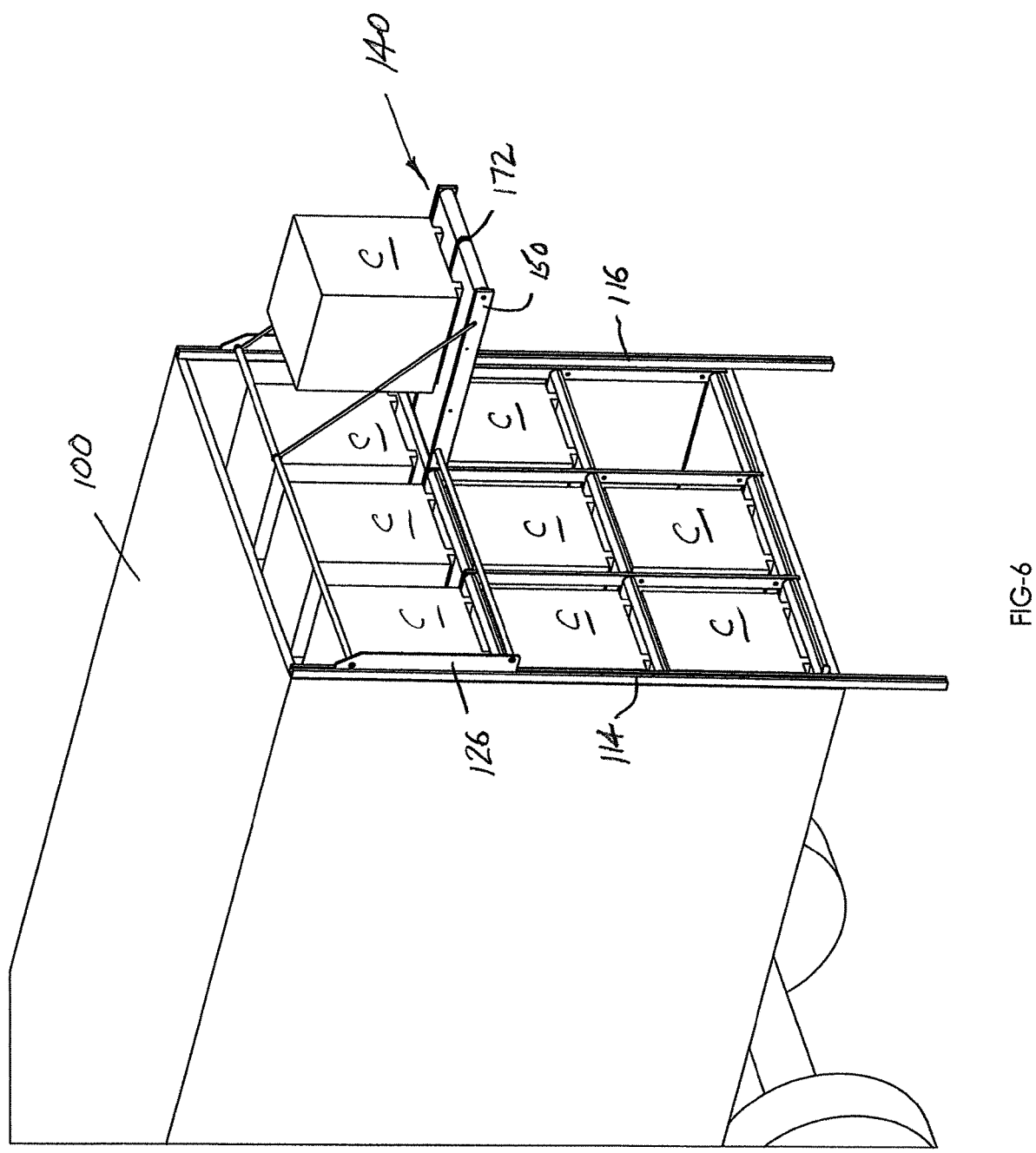
Figure 7:
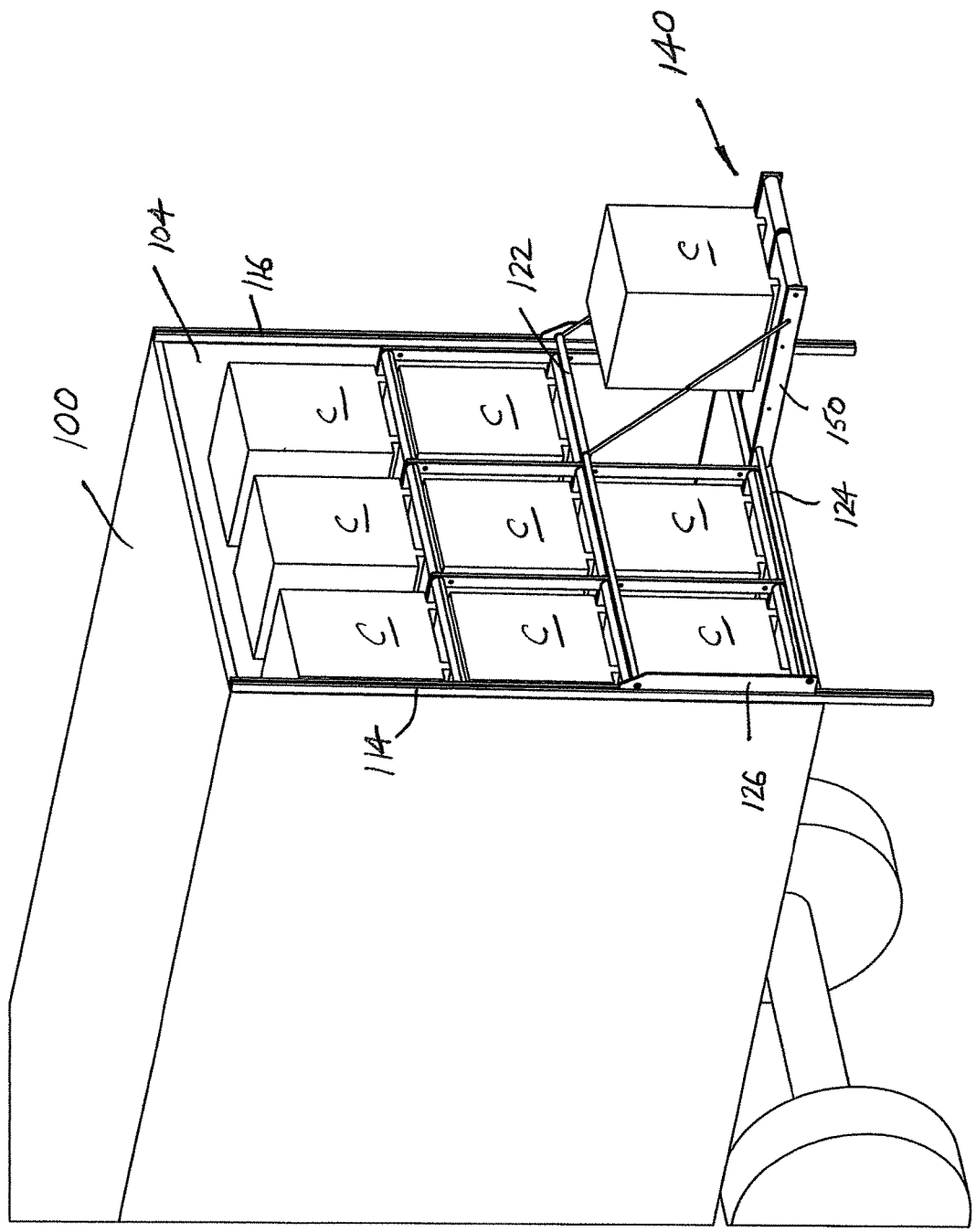
Figure 8:
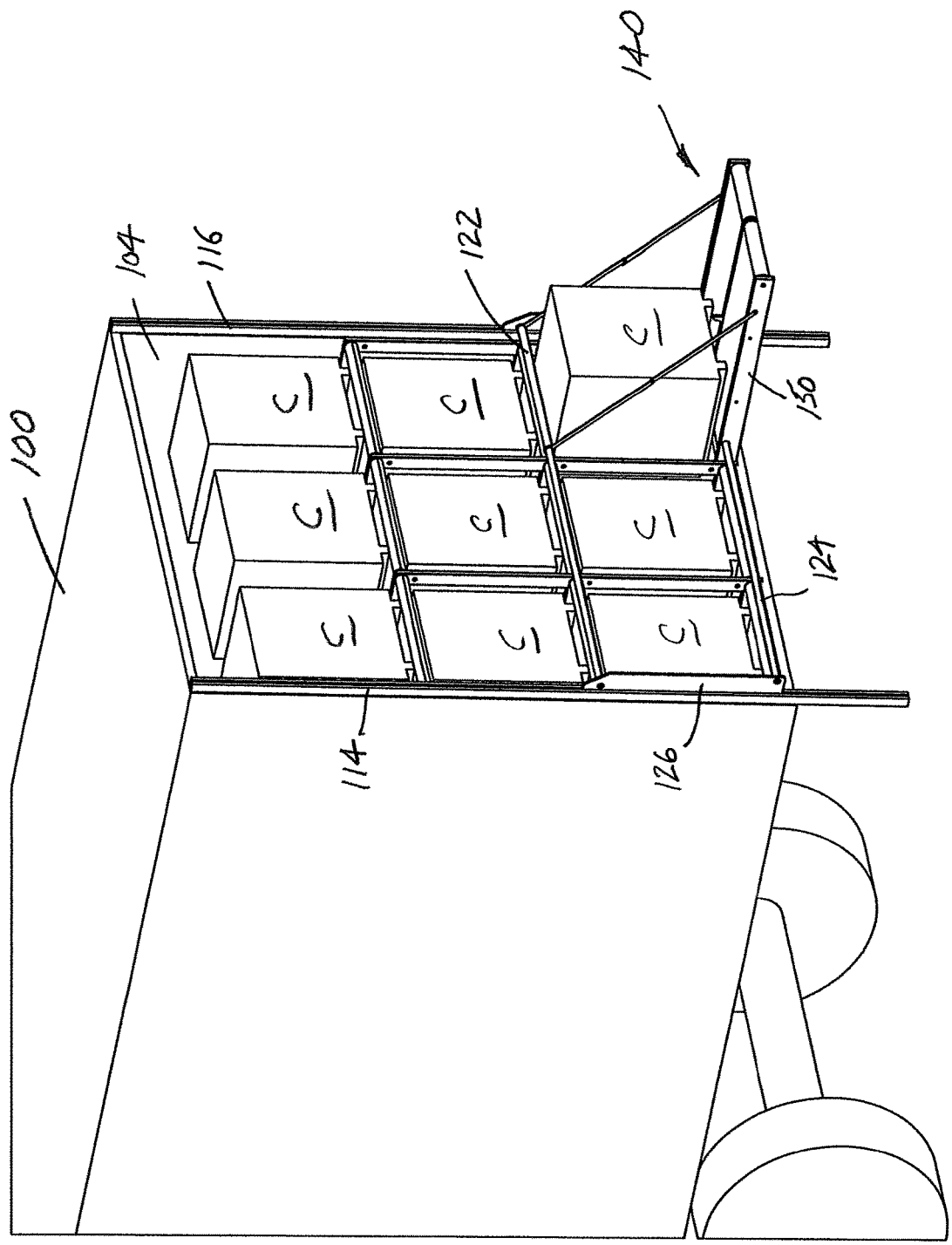
Figure 9:
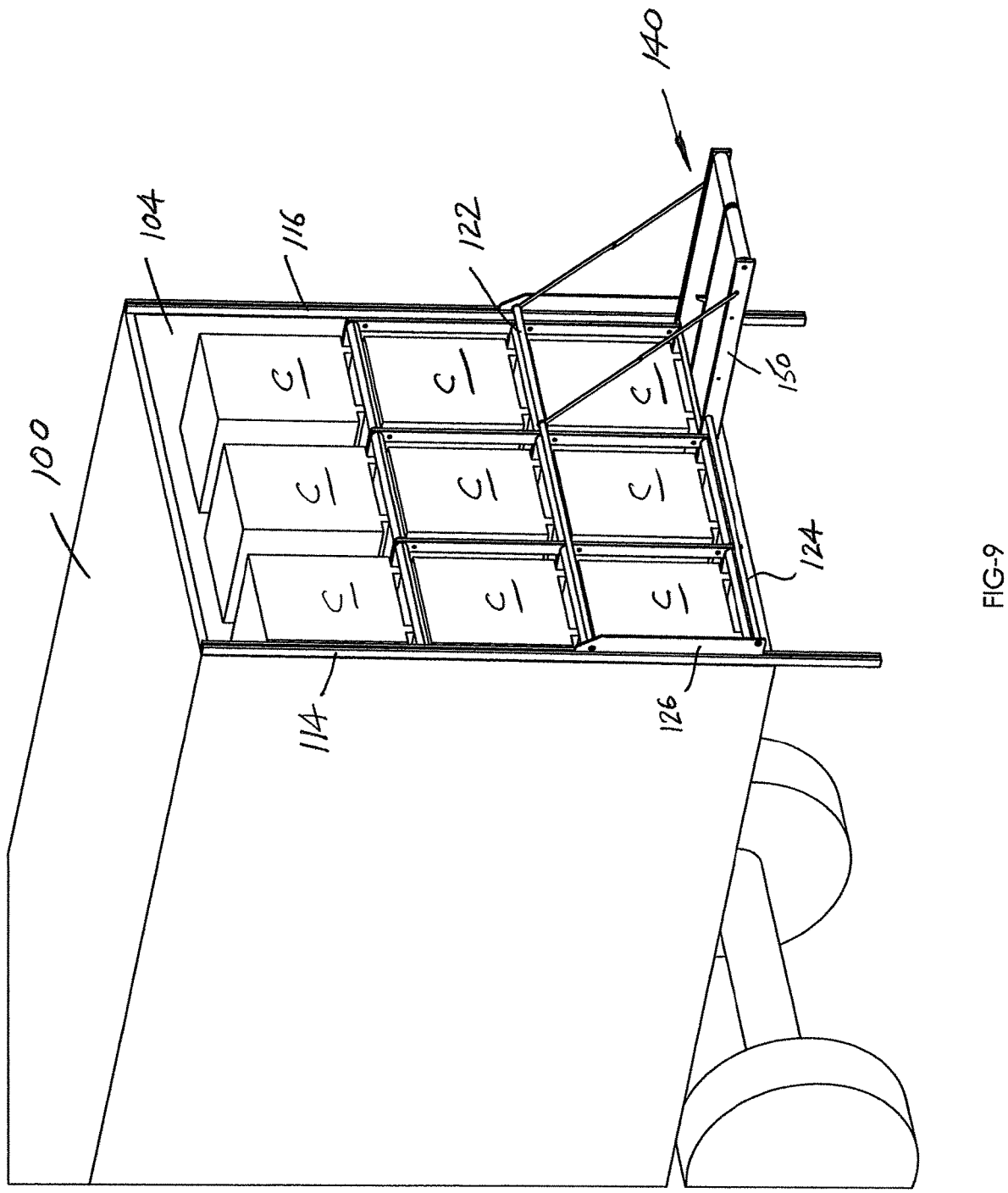
Figure 10:
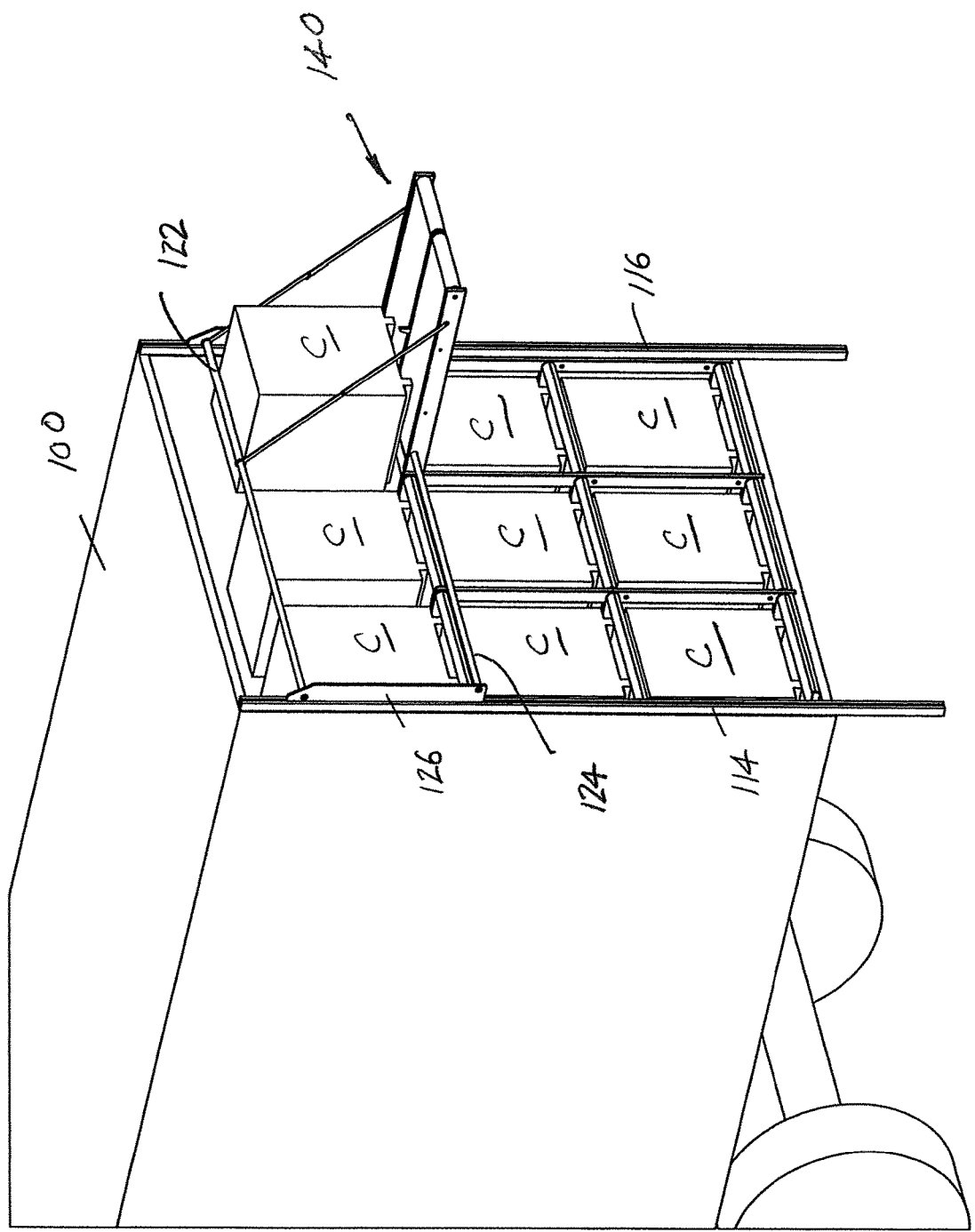
Figure 11:
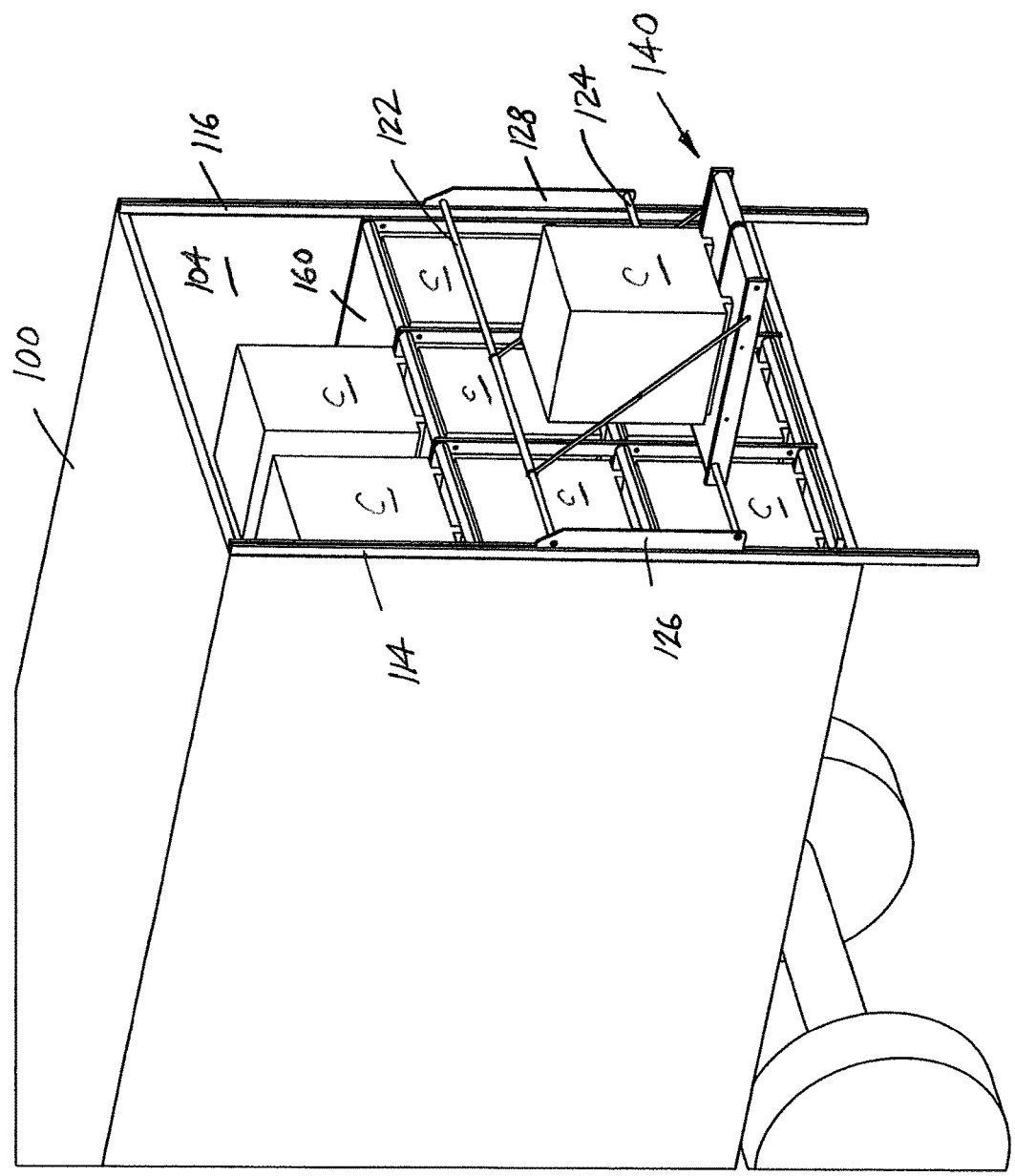
Figure 12:
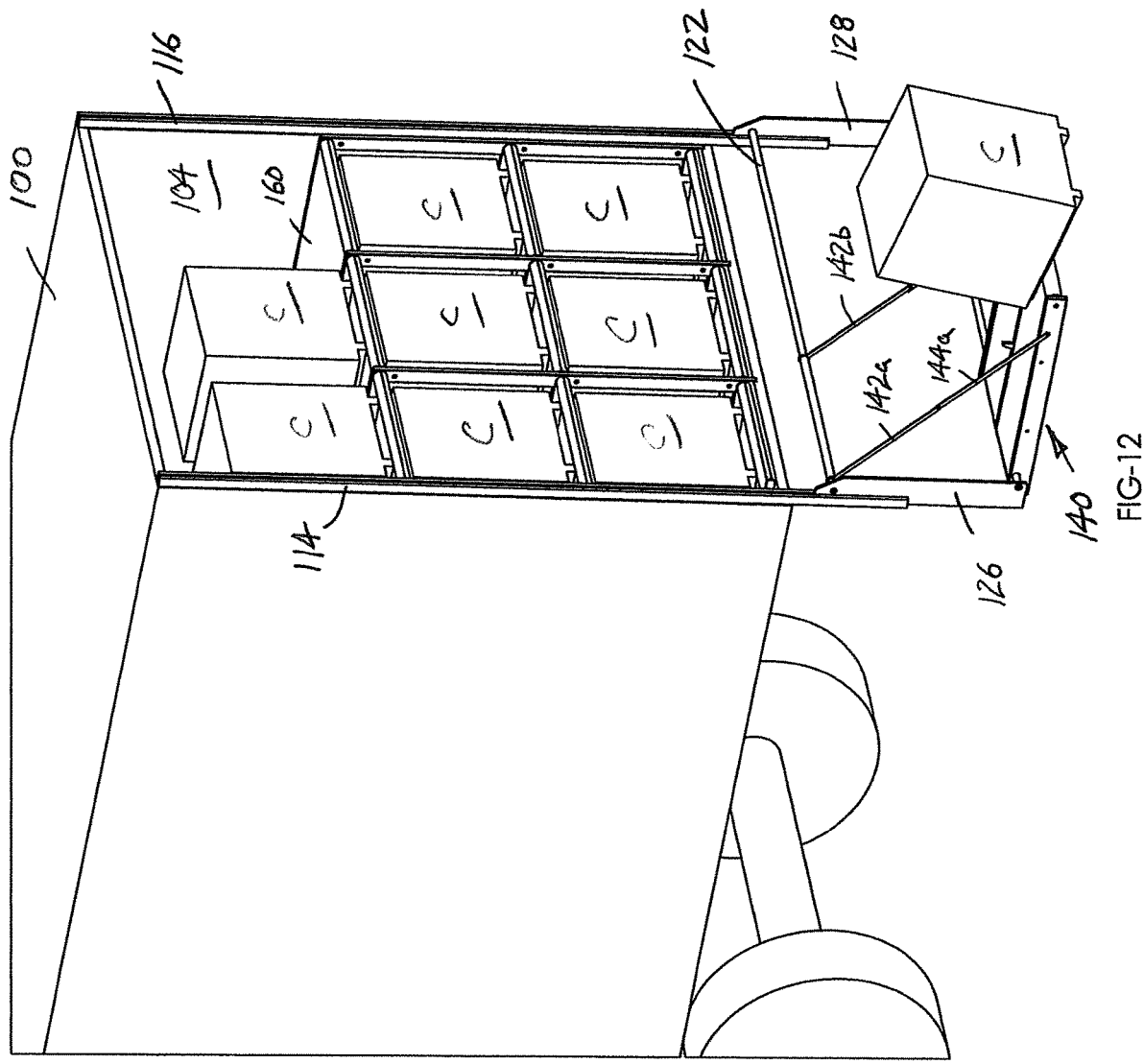

Another motor moves the frame 120 vertically upward and downward relative to the channels 114, 116 in order to selectively reposition the platform 140 at different vertical locations relative to the cargo compartment 104 (see three different levels of the platform in FIGS. 2-4). Further, the range of movement of the frame 120 in a vertical direction extends to a lower position shown below the cargo compartment 104, for example, as shown in FIG. 12 so that cargo items can be transferred from the platform 140 to an associated surface such as the ground surface.

Yet another motor moves the platform 140 laterally relative to the frame 120 whereby the platform can be repositioned side-to-side relative to the storage compartment 104. For example, a comparison of FIGS. 2-4 illustrates the lateral movement of the platform 140. It will be appreciated that the vertical movement of the frame 120 (and consequently of the platform 140) can be independent of, or in combination with, the lateral movement of the platform in order to maximize the speed and efficient operation of the platform 140.

Figure 19:
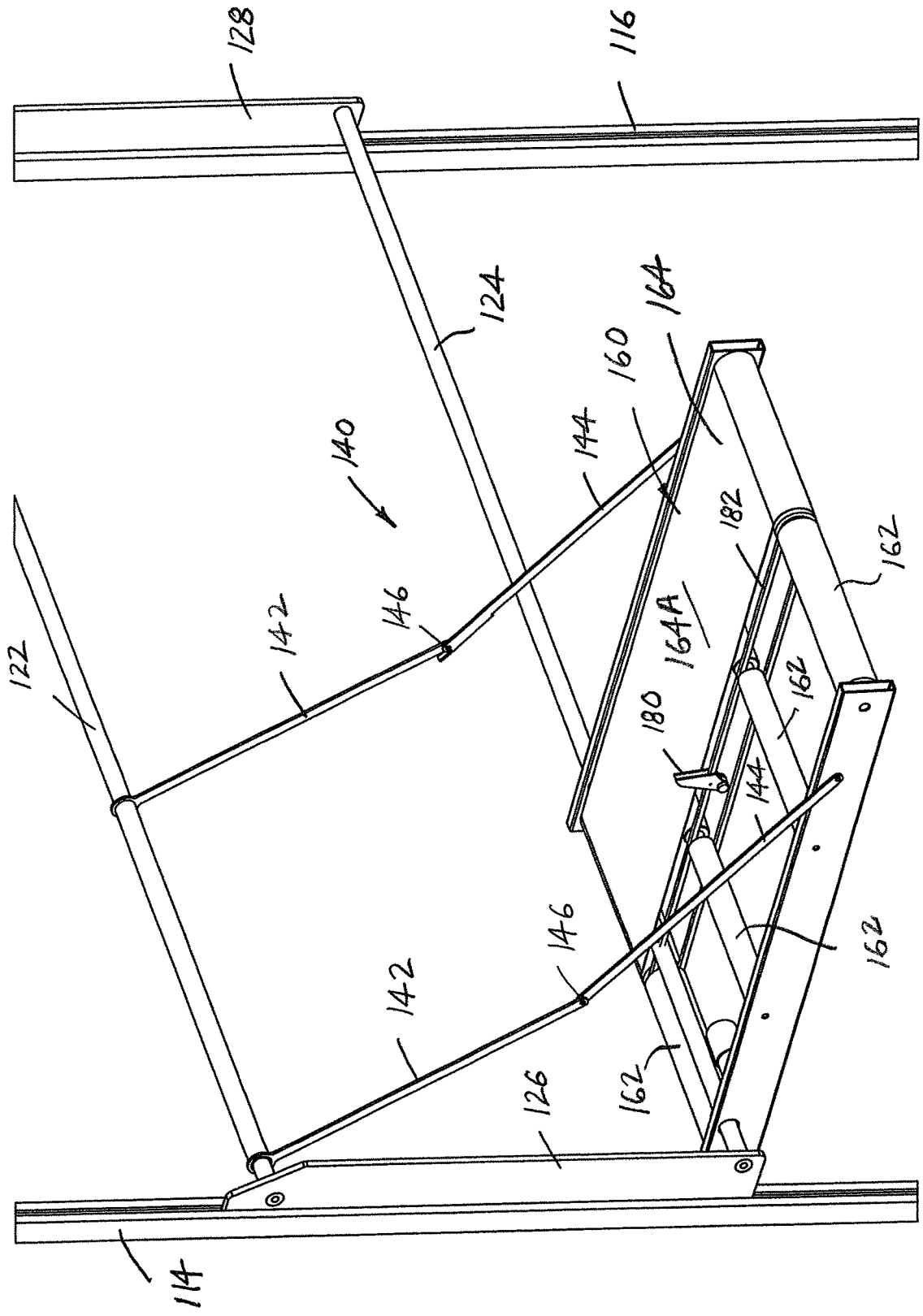

FIGS. 2-15 illustrate that the cargo compartment 104 can be one large compartment or can be subdivided into individual compartment portions. For example, if there is no physical division or separation of the cargo compartment 104, then large or small cargo items may be received in the single cargo compartment. In other instances, the cargo compartment 104 can be divided into (i) physically separated compartment portions (i.e., compartment portions that include a physical barrier), (ii) a compartment portion that lacks a physical barrier separating regions of that compartment portion into smaller portions but operates as separate compartment portions, or (iii) a combination of physically separated regions or non-physically separated regions of a compartment portion. It will also be appreciated that the compartment portions may or may not be the same size. For example, and as illustrated in FIG. 2, the cargo compartment 104 has three separate levels 104A, 104B, 104C. The first or upper level 104A forms a compartment portion defined in part by the sidewalls of the cargo compartment 104 and the upper wall or ceiling of the cargo compartment. No physical barrier laterally subdivides or separates the upper level 104A, however, the upper level is "illustrated" as three separate compartment portions evidenced by three separate cargo items extending laterally across the upper level. The "floor" of the upper level 104A is formed by three separate conveyors 160, shown here as equal sized conveyors (although it will be appreciated that the conveyors can be of different sizes also). Each conveyor 160 in a compartment portion, and the conveyor(s) 160 associated with the movable platform 140, is of conventional construction that includes at least first and second conveyor rollers 162 (FIGS. 19-20) that are longitudinally spaced apart (and likely includes multiple intermediate conveyor rollers) and surrounded by a belt 164 that extends in a continuous loop and rotates about the conveyor rollers. Although a conveyor 160 is a conventional structure, the belt 164 is removed from one of the conveyor portions in FIGS. 19-20 for ease of illustration and to more particularly show rollers 162 disposed in spaced relation. The rollers 162 of the adjacent conveyors 160 on the platform 140 are preferably interconnected so that the individual belts 164 will move at the same speed. Typically, one or more of the conveyor rollers 162 is powered or motorized so that the belt 164 rotates and defines a moving, upper belt surface 164A that proceeds around a first endmost roller, and then defines a moving, lower belt surface 164B as the belt proceeds toward a second endmost roller. A cargo item C thus rides on and is moved by the upper belt surface portion 164A of the conveyor 160 to advance an individual cargo item(s) toward the door/opening of the cargo compartment 104. Likewise, cargo items C on the adjacent conveyors 160 are similarly advanced toward the door/opening of the cargo compartment 104. The conveyor 160 in the single cargo compartment or conveyors in the separate compartment portions is/are structurally similar and operate in substantially the same manner so that description of the structure and function of conveyor 160 applies to either the conveyors on the platform or in the cargo compartment/compartment portions unless particularly described as being only applicable to one of these end uses.

The lower two levels 104B, 104C are physically separated by a conveyor 160 situated both above and below these levels of compartment portions. In addition, the two levels 104B, 104C are physically separated by vertical dividers 170. Here, the dividers 170 define three laterally spaced, physically separated compartment portions in each of these two levels 104B, 104C. Again, as will be appreciated, the compartment portions need not each be the same size (horizontally and/or vertically) but are merely shown in this manner for ease of illustration. Likewise, a greater or lesser number of compartment portions may be provided and as particularly required by the type of cargo C being delivered.

The conveyors 160 for the different compartment portions are preferably driven by separate motors (not shown), or with one or more common motors, where suitable distribution of the motive power from the motor(s) can be distributed to individually and/or simultaneously operate one or more of the conveyors.

Figure 20:
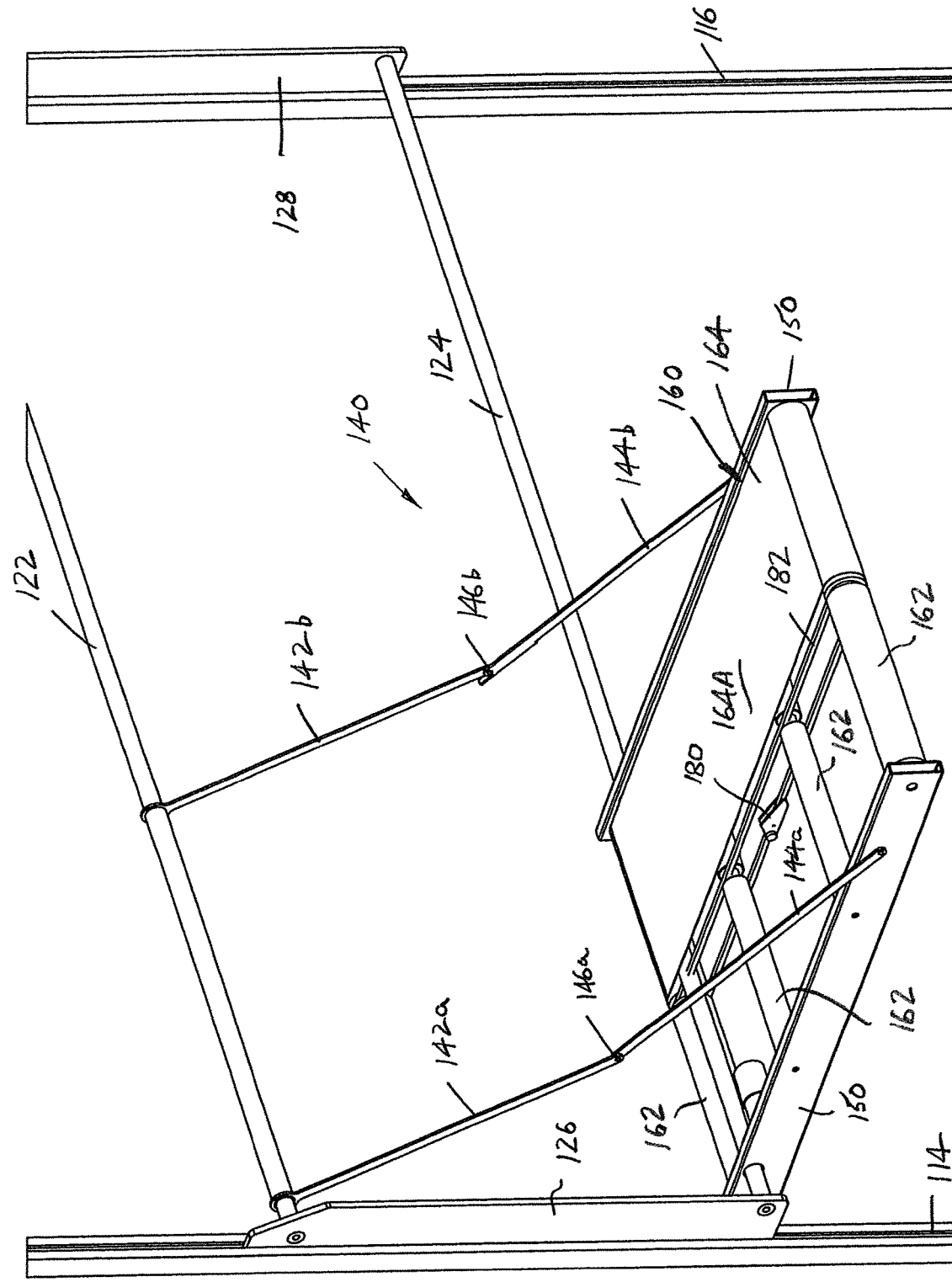

The platform 140 preferably includes a conveyor 160 or preferably first and second conveyors that are divided by a gap 172 that extends in the direction of the movement of the individual belts 164 of the platform conveyors. Particularly, one or more pusher bars 180 (FIG. 19) are secured in spaced arrangement along a flexible drive member such as a chain 182 that rotates in conjunction with the belts 164 of the platform conveyors 160. The pusher bars 180 are dimensioned to extend above the upper surfaces 164A of the belts 164 of the platform conveyors 160, and preferably the pusher bars automatically move or collapse to a reduced height position where the pusher bars do not extend above the lower surfaces 164B of the belts on the return path of the belts on each conveyor (FIG. 20). Although the pusher bars 180 can be moved to a collapsed/non-operative state in different manners, a preferred embodiment secures the pusher bars to the chain 182 that rotates or travels between the two conveyors 160 on the platform 140. The pusher bars 180 are preferably weighted on one end so that gravity causes the pusher bars to stand up (FIG. 19—the pusher bars extend perpendicularly from the chain 182 and through the gap 172 between the platform conveyors 160) when the pusher bar is traveling along the top of its rotational path (FIG. 19), and automatically retract (FIG. 20—the pusher bars generally align with the chain and do not extend through the gap) as the pusher bars move to the underside of the travel path of the chain. In this manner, the pusher bars 180 can assist the upper surfaces 164A of the moving conveyors 160 to move cargo C received thereon by physically abutting along a selected height of and against an edge of a cargo item and limiting potential slippage between the cargo item and the upper surfaces of the platform conveyors. Conversely, the pusher bars 180 automatically retract during the return path of travel of the conveyors 160 and the chain 182 so that the pusher bars do not inadvertently make contact with anything disposed adjacent the underside of the platform conveyors.

Figure 13:
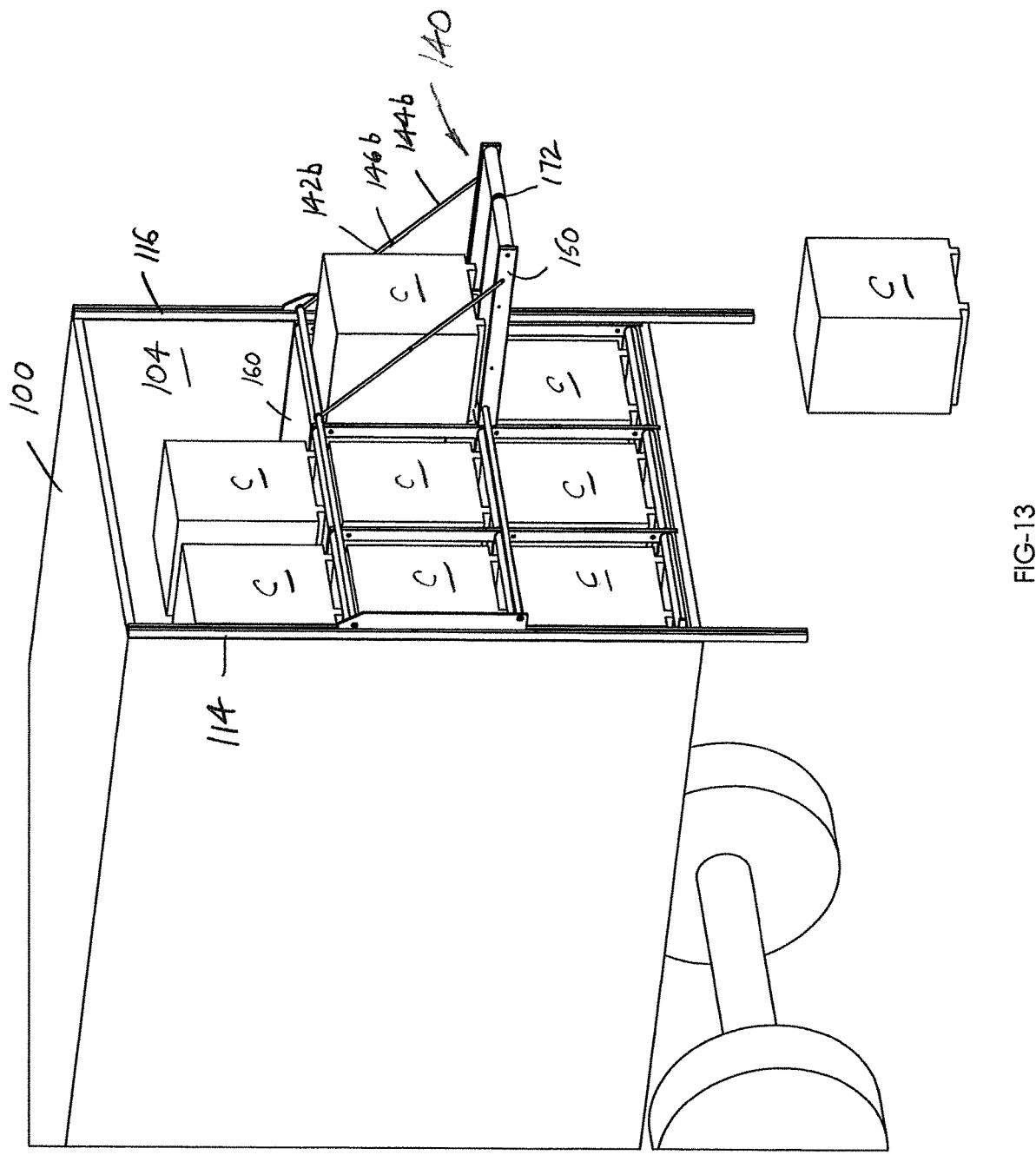
Figure 14:
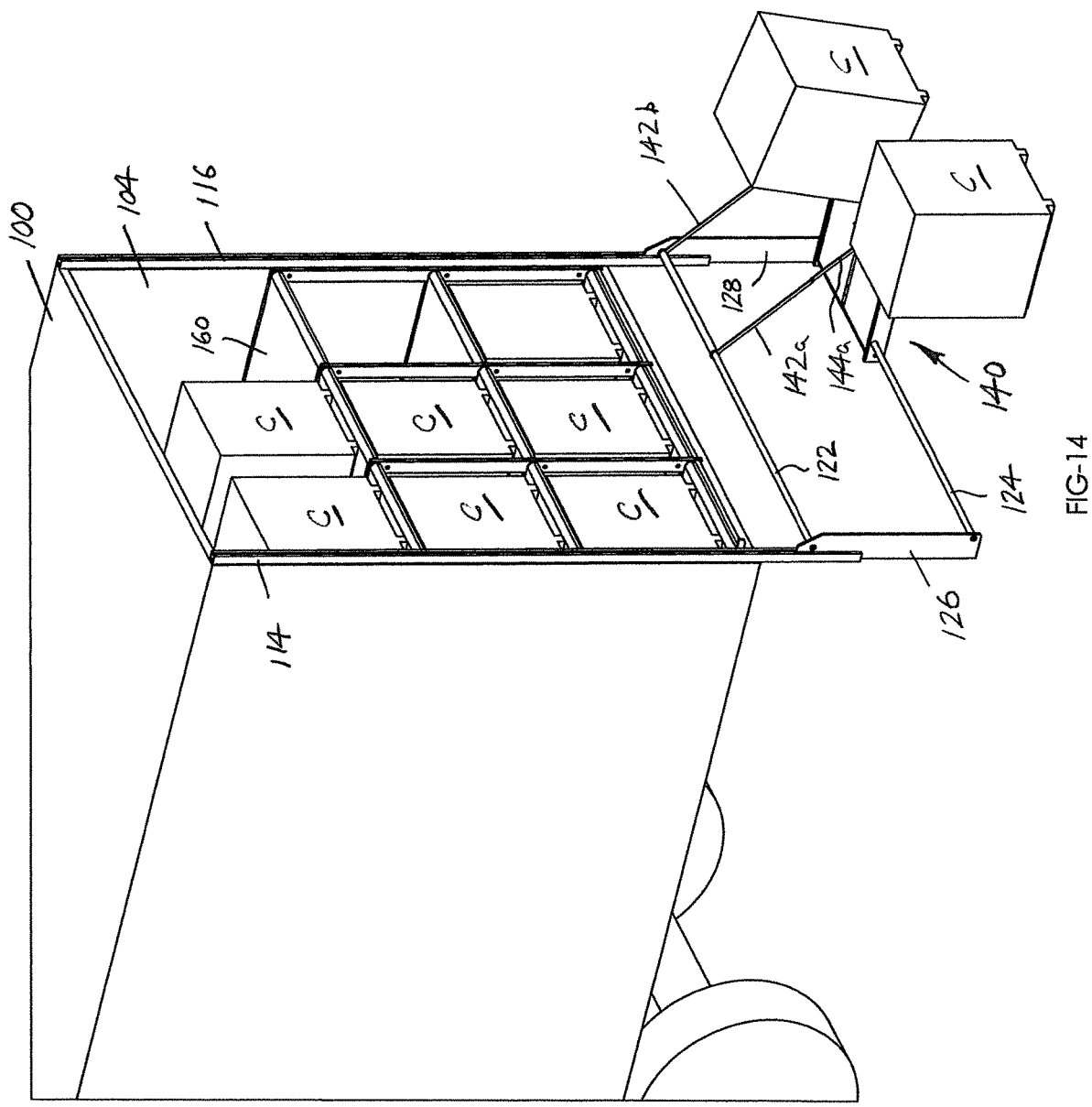
Figure 15:
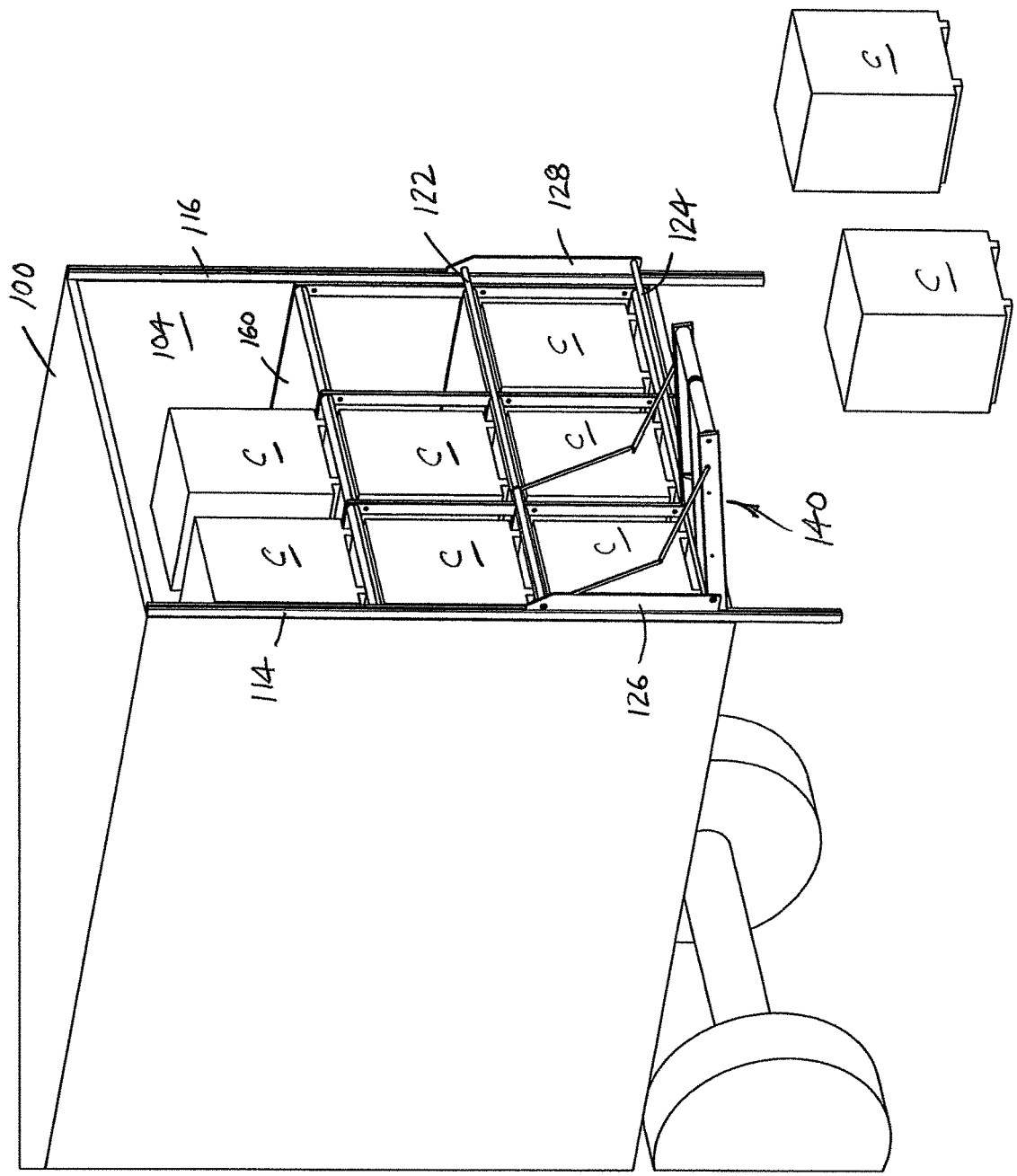
Figure 21:
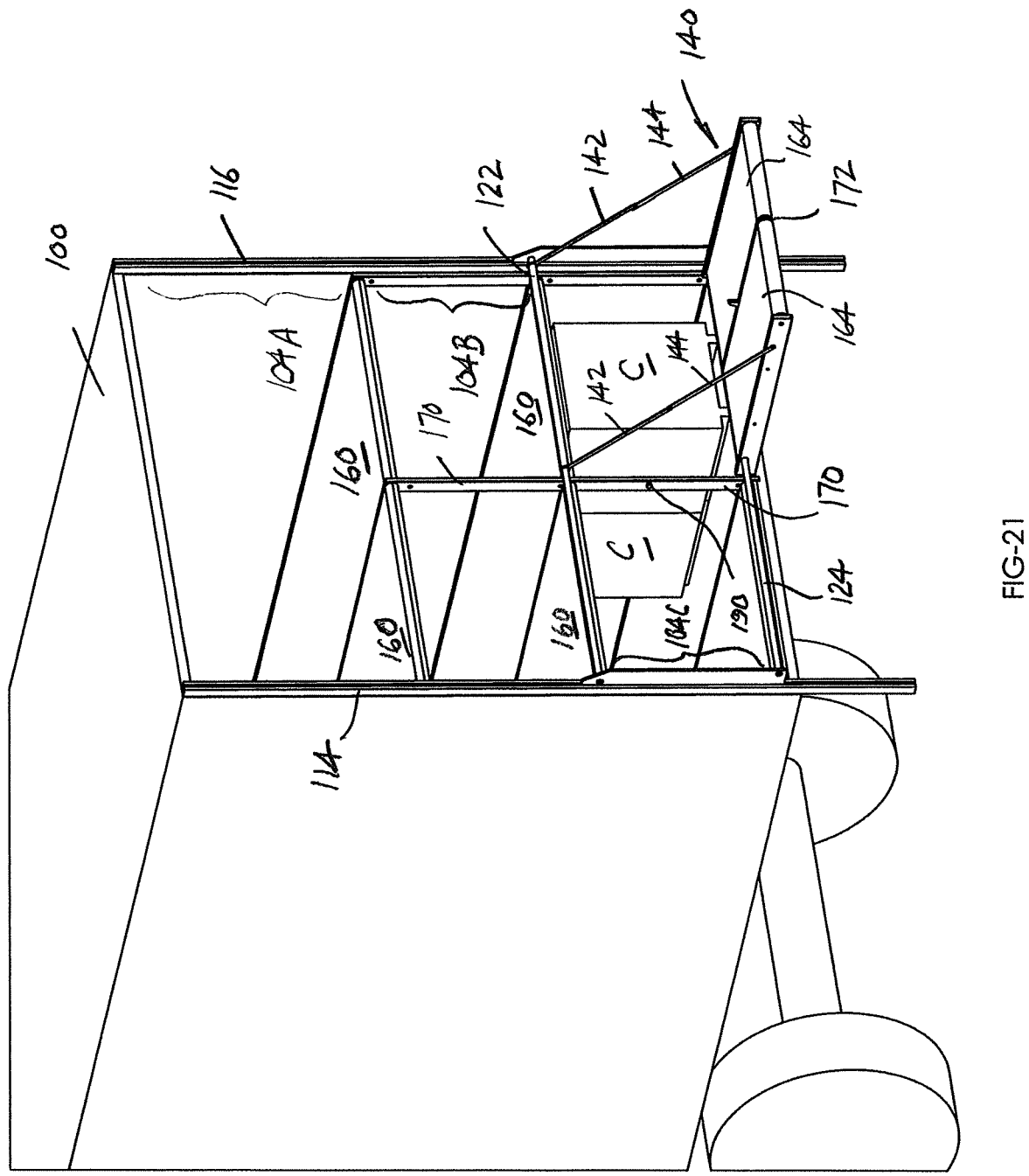
Figure 22:
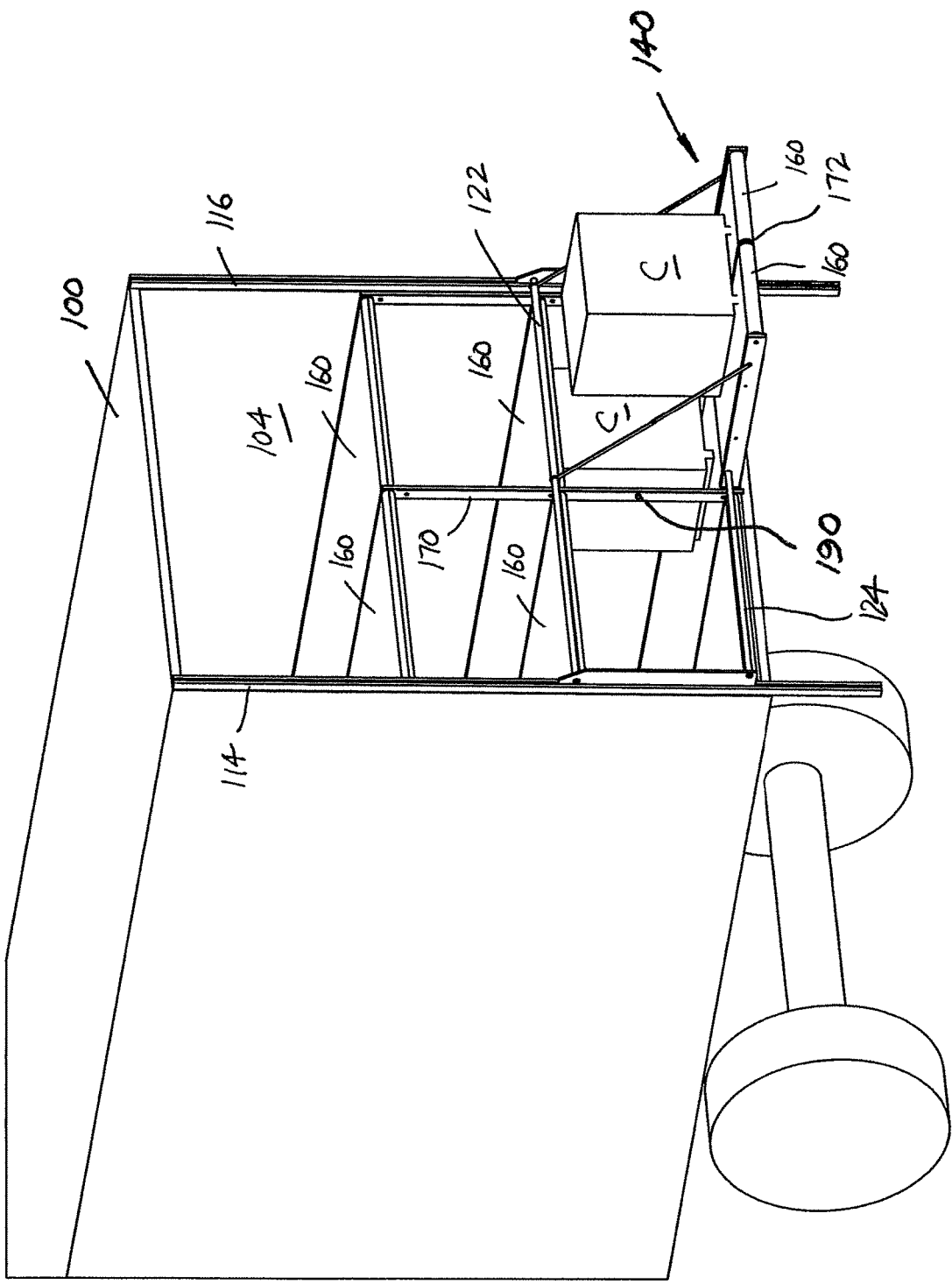

In addition, a sensor(s) 190 (FIGS. 21-22), such as an optical sensor, directs a beam of light across a rear portion of a compartment portion. The sensors can be located at various locations, and the sensors are preferably located at or near the rear end of each of the compartment portions where cargo items C would transition from the compartment portions to the platform 140. By operating the platform conveyors 160 at a speed greater than the conveyors 160 of the individual compartment portions, a cargo item C that may have been abutting against an adjacent cargo item within the individual compartment portion (FIG. 21) will separate and form a space (FIG. 22) between the individual cargo items C due to the increased speed as the cargo item transfers onto the platform conveyors 160 and separates from the next adjacent cargo item on the conveyor in the compartment portion. This increased speed creates the space that is detected by the sensor 190 so that movement of the compartment portion conveyor 160, and likewise the next adjacent cargo item C thereon, can be stopped. In this way, only the desired cargo item C is transferred onto the platform 140. Thereafter, the platform 140 can be moved to another compartment portion and the direction of rotation of the platform conveyors 160 reversed to load the cargo item C into another compartment portion (FIGS. 7-9), or the platform can be moved to another desired location, e.g. the ground surface, where the platform conveyor is then re-started to move or eject the cargo item from the platform (FIG. 12). The pusher bars 180 assure that the cargo item C is effectively and efficiently moved off of the platform conveyors 160. The operation can then be repeated for one or more additional cargo items C as illustrated in FIGS. 13-15.

It is also understood that one or more of the sensors 190 can be configured to read indicia such as a bar code label or wirelessly detect/read RFID chip information associated with an individual cargo item C to identify which cargo item has been transferred to the platform 140. It will also be appreciated that a controller or processor (computer) (not shown) can operatively interact with a memory that stores information or data received from the sensor(s) 190 regarding the particular location of a cargo item C in the storage compartment 104, whether or not a cargo item has been delivered, and/or if the cargo item has been delivered where and when the cargo item was delivered. Thus, further data or information such as GPS, and/or date/time information, and/or compartment temperature, etc., can be inputted to the controller/processor for monitoring and tracking cargo, and some or all of the data/information can be displayed on a suitable display device (not shown) associated with the vehicle or a portable device such as a tablet, smart phone, etc., or transferred in any conventional manner (e.g., wired or wirelessly) to a remote computer system or device (not shown), and/or printed if a hard copy of the information is required.

Figure 17:
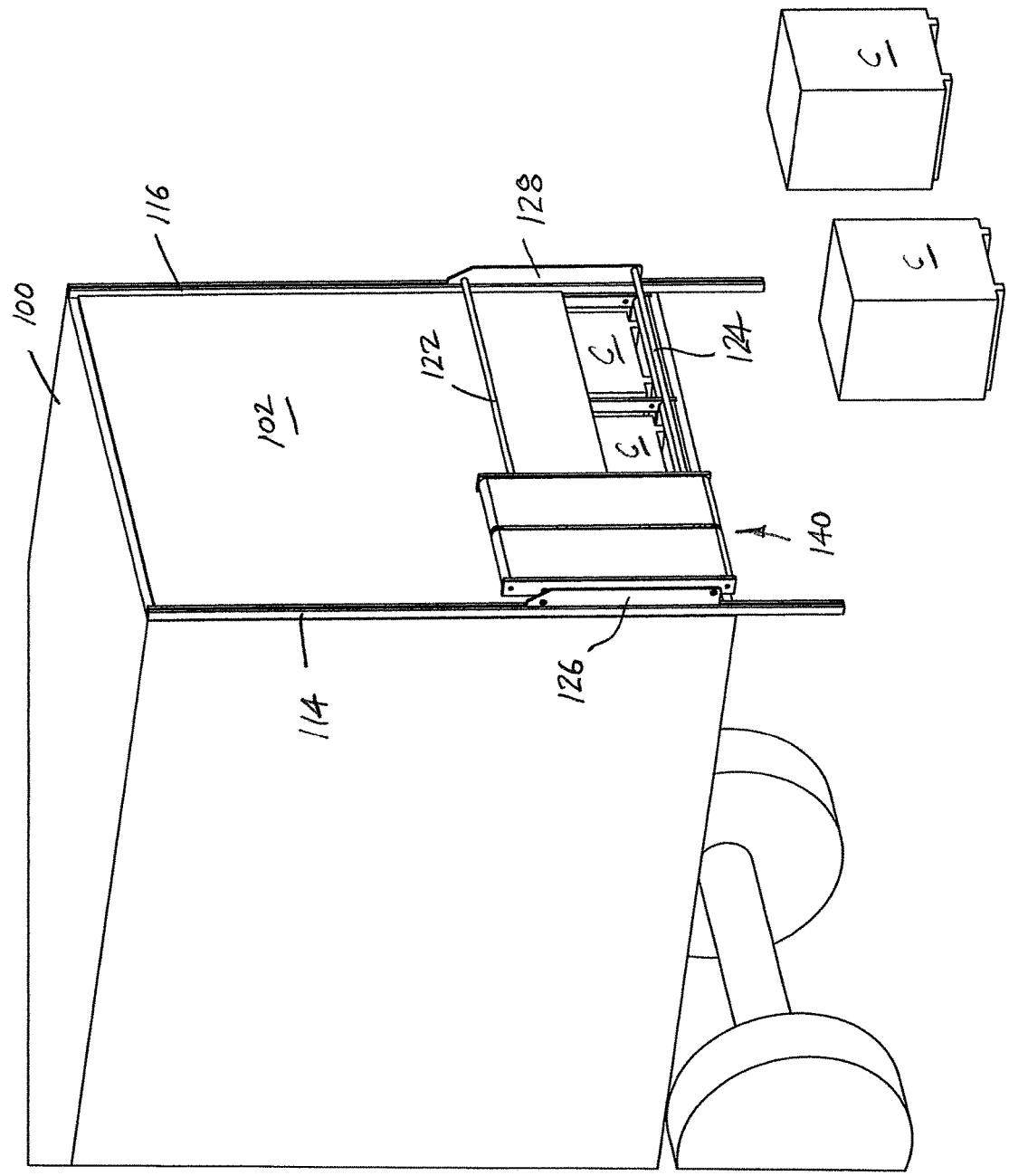
Figure 18:
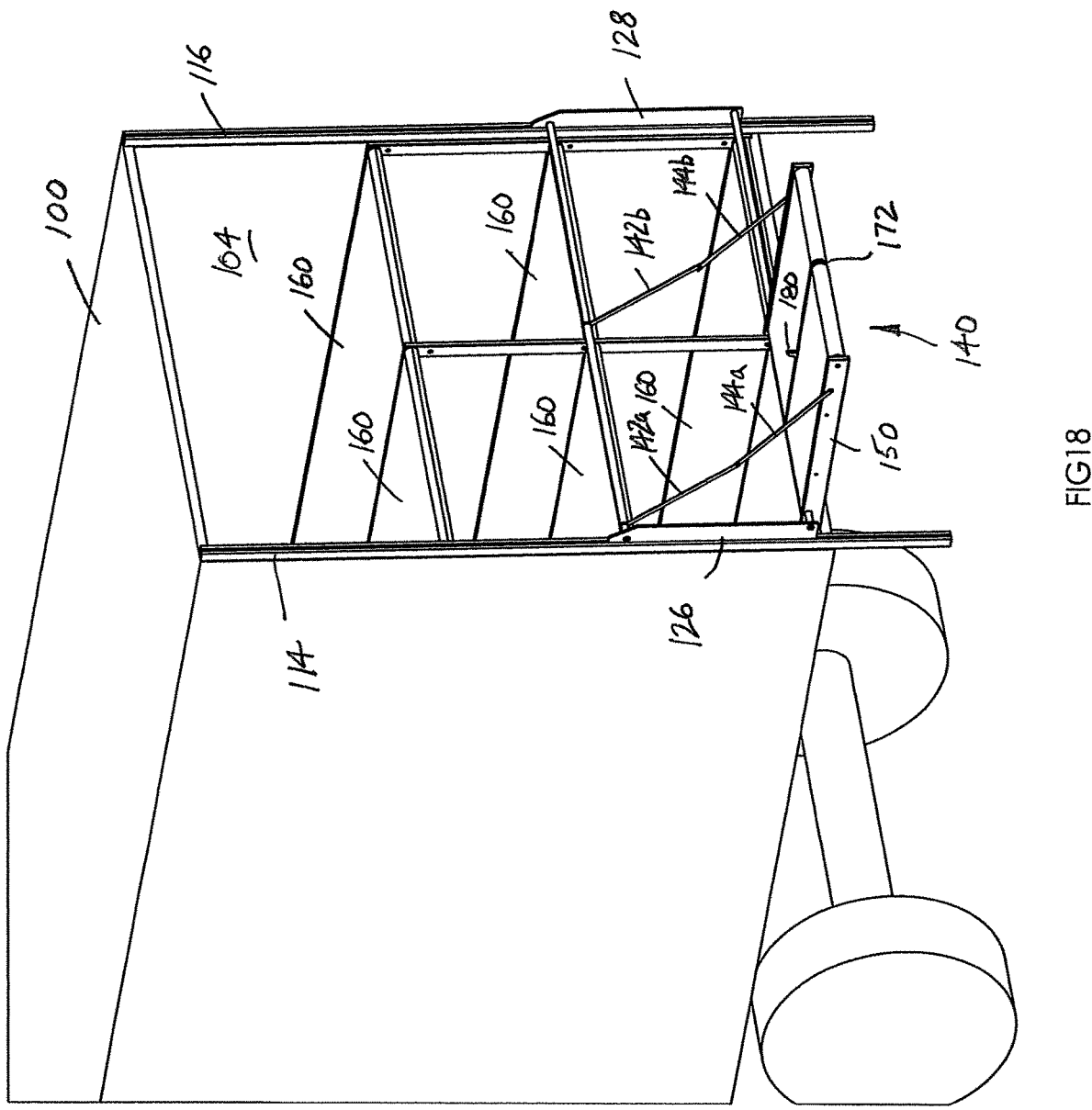

The motors and sensors associated with operation of the door, conveyors, conveyor portions, lift assembly, etc. are all interconnected to the controller (not shown). The controller can be programmed to autonomously open the door 102 (FIGS. 1 and 2), lower the platform 140 of the lift assembly (FIG. 2), move the platform to a desired location of the storage compartment 104 (FIGS. 3 and 4), unload a cargo item C from a compartment portion onto the platform (FIGS. 5 and 6), move the cargo item to another compartment portion (FIGS. 7, 8, and 9), move the platform to a compartment portion and receive another/second cargo item (FIG. 10), move the second cargo item to a desired location such as the ground surface (FIG. 11), move the second cargo item off the platform onto the ground surface (FIG. 12), move the platform to a compartment portion to retrieve another/third cargo item (FIG. 13), move the third cargo item to a desired location such as the ground surface and move the third cargo item off the platform onto the ground surface (FIG. 14), move the platform from a deployed position (FIG. 15) to a storage position (FIG. 16), and close the door to the storage compartment (FIG. 17).

Figure 23:
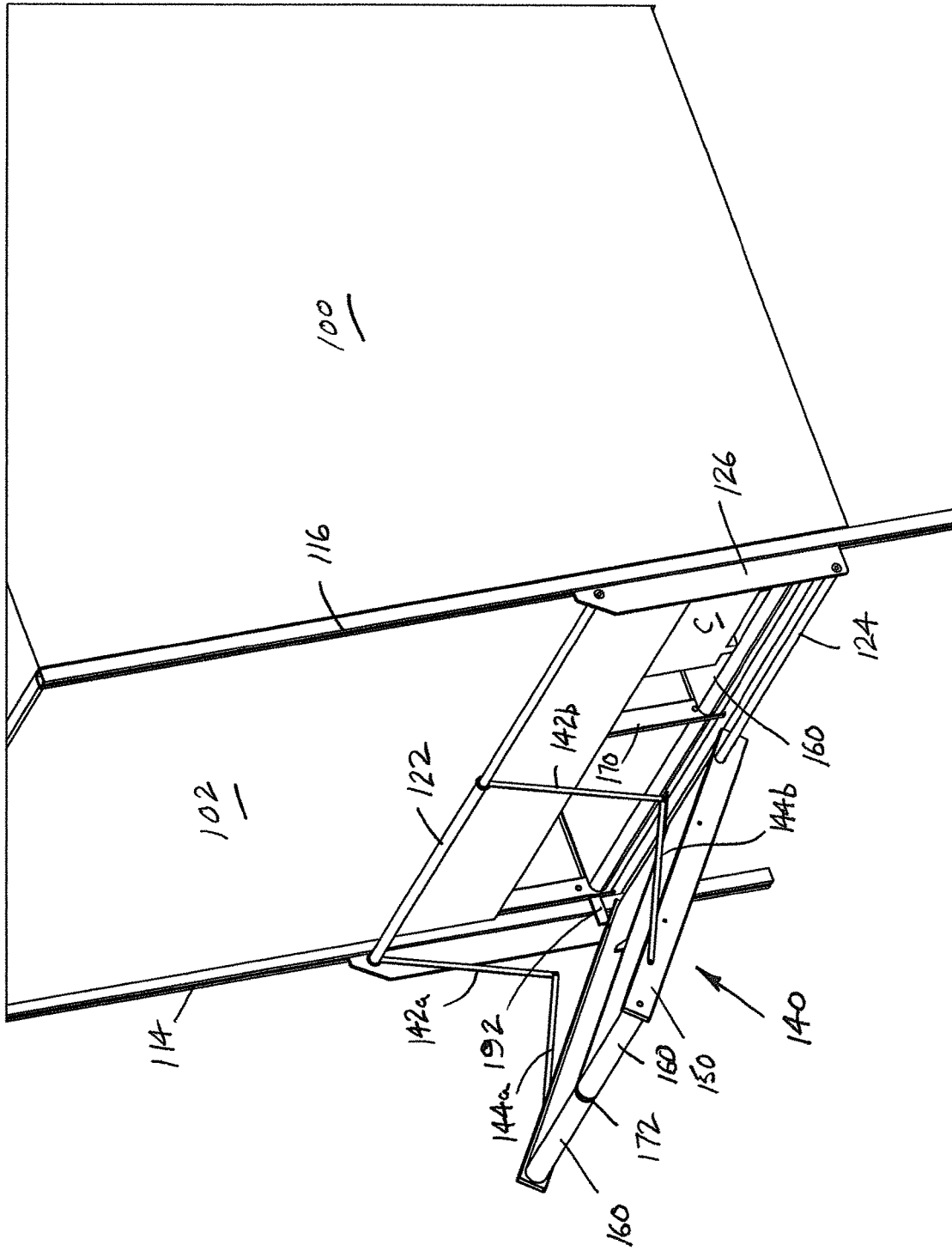

FIG. 23 shows a lever or pin 192 that extends from the storage compartment 104 and is intended to selectively engage the platform 140. The lever 192 is fixedly secured to one of the vertical channels 114, 116, and in some instances, a lever may be secured to each of the vertical channels so that description of one lever applies to the other lever if two levers are used. Lever 192 is mounted so that when the platform 140 moves laterally relative to the storage compartment 104 as described above to load and unload cargo items C to and from various compartment portions of the storage compartment, the platform does not engage the lever. The lever 192, however, assists with rotation of the platform 140 from the horizontal deployed position to the vertical, stored position (FIG. 1). Particularly, the lever 192 extends rearwardly a sufficient dimension so that when the edge of the platform 140 (i.e., the edge adjacent the storage compartment 104) is positioned beneath the lever and the platform is then moved upwardly, abutting engagement of the lever with the platform edge exerts a moment, couple, or torque on the platform so that the platform pivots or rotates about the horizontal member 124 from the horizontal, deployed position to the vertical, stored position. Typically, when the platform 140 is in use (i.e., moving upwardly and downwardly, and/or laterally side to side in the deployed state of the platform), an outer lateral side of the platform is spaced inwardly from the lever 192 so that the platform edge does not engage the lever.

Figure 24:
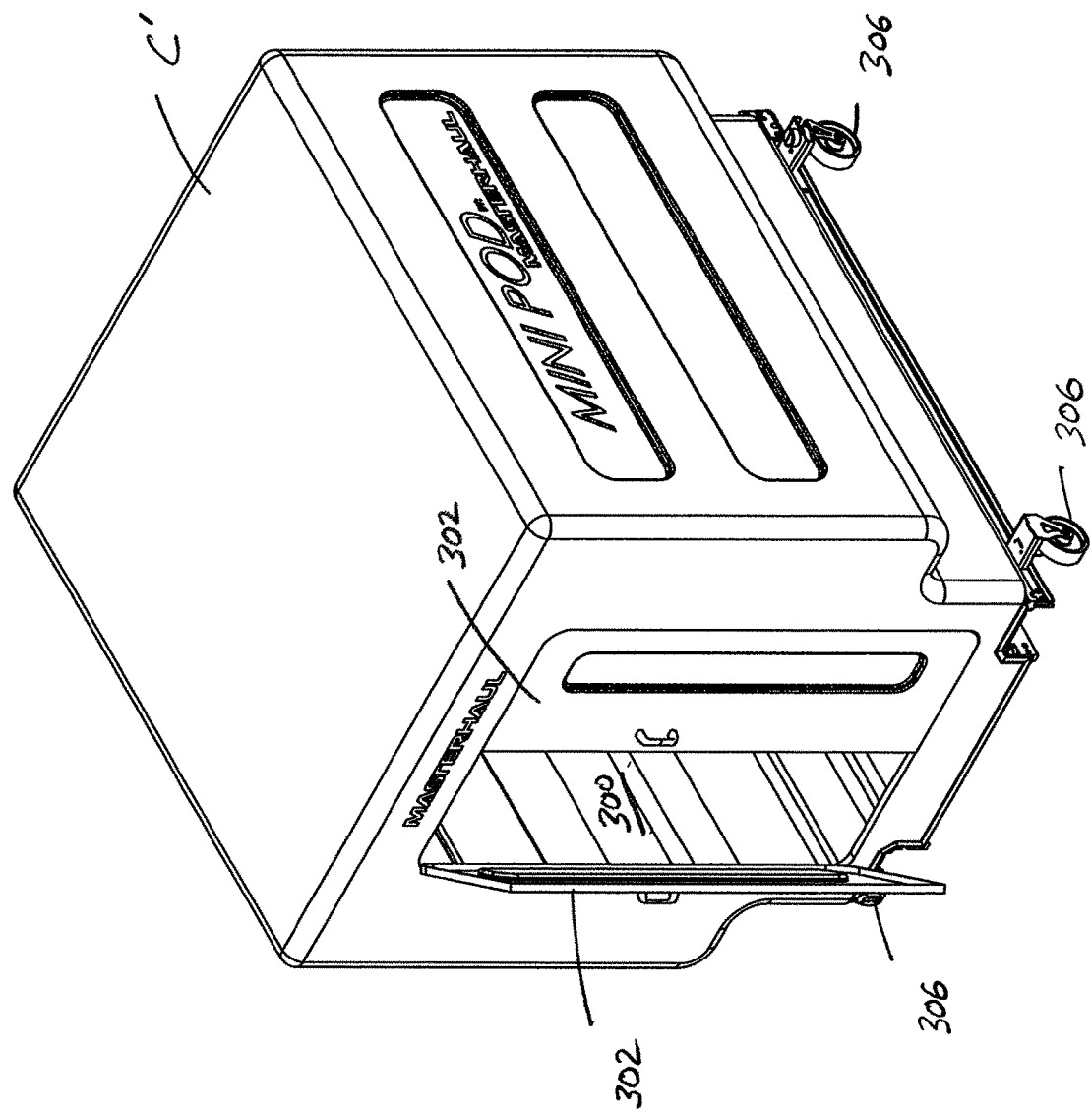
FIG. 24 is a perspective view of a storage container or pod, preferably with integral wheels, that receives and stores cargo therein.
Figure 25:
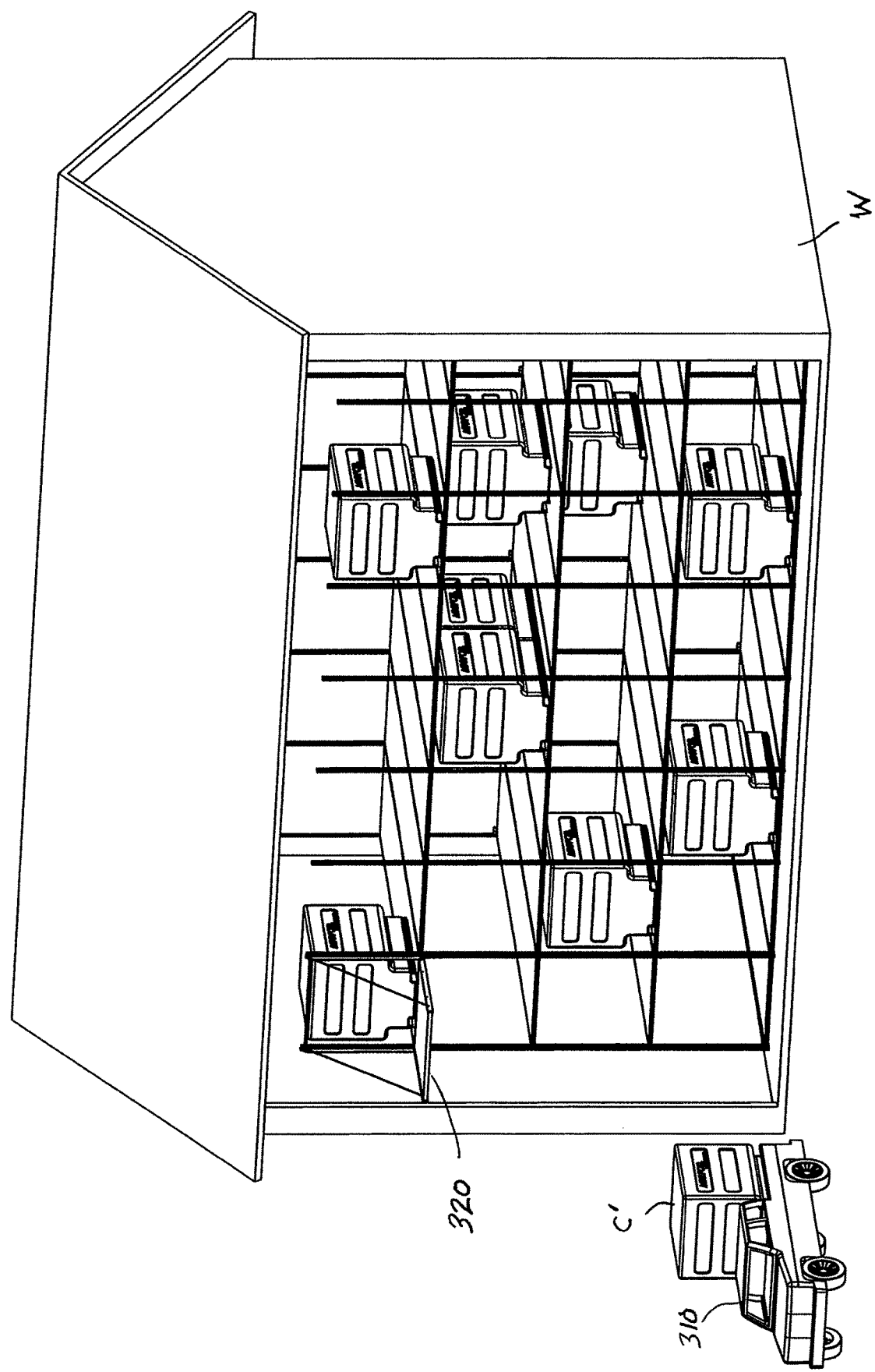
FIG. 25 is a representation of a storage facility where the storage containers/pods, for example, shown in the various figures may be stored.

FIG. 24 shows a movable storage container or bin C' that stores cargo items therein. The movable storage container C' preferably has one or more doors 302 for access to an internal storage compartment 300. It is also contemplated that the movable storage container C' has wheels 306 to facilitate rolling movement of the container over the ground surface. The movable storage container C' is preferably dimensioned for receipt in and out of the truck bed of a conventional pickup truck 310 (FIG. 25). It is also contemplated that the movable storage container C' can be loaded and unloaded from the truck 310, for example, using a loader/unloader of the type shown and described in commonly owned application PCT/US19/29949, filing date 30 Apr. 2019, the entire disclosure of which is expressly incorporated herein by reference. Alternatively, a lift platform 320 associated with a storage building or warehouse W may be positioned at the rear end of the truck 310 so that the movable storage container C' can be unlatched and rolled from the truck bed onto the lift platform. Thereafter, the lift platform 320 can move the storage container C' into a desired storage location in the warehouse W. This allows the consumer to fill or empty the movable storage container C' at a site remote from the warehouse W, and use a conventional pickup truck 310 to transport the movable storage container to a storage facility or warehouse. Use of a conventional pickup truck 310 advantageously allows the consumer to forego the need for a special truck and facilitates movement and storage of cargo items.

Figure 26:
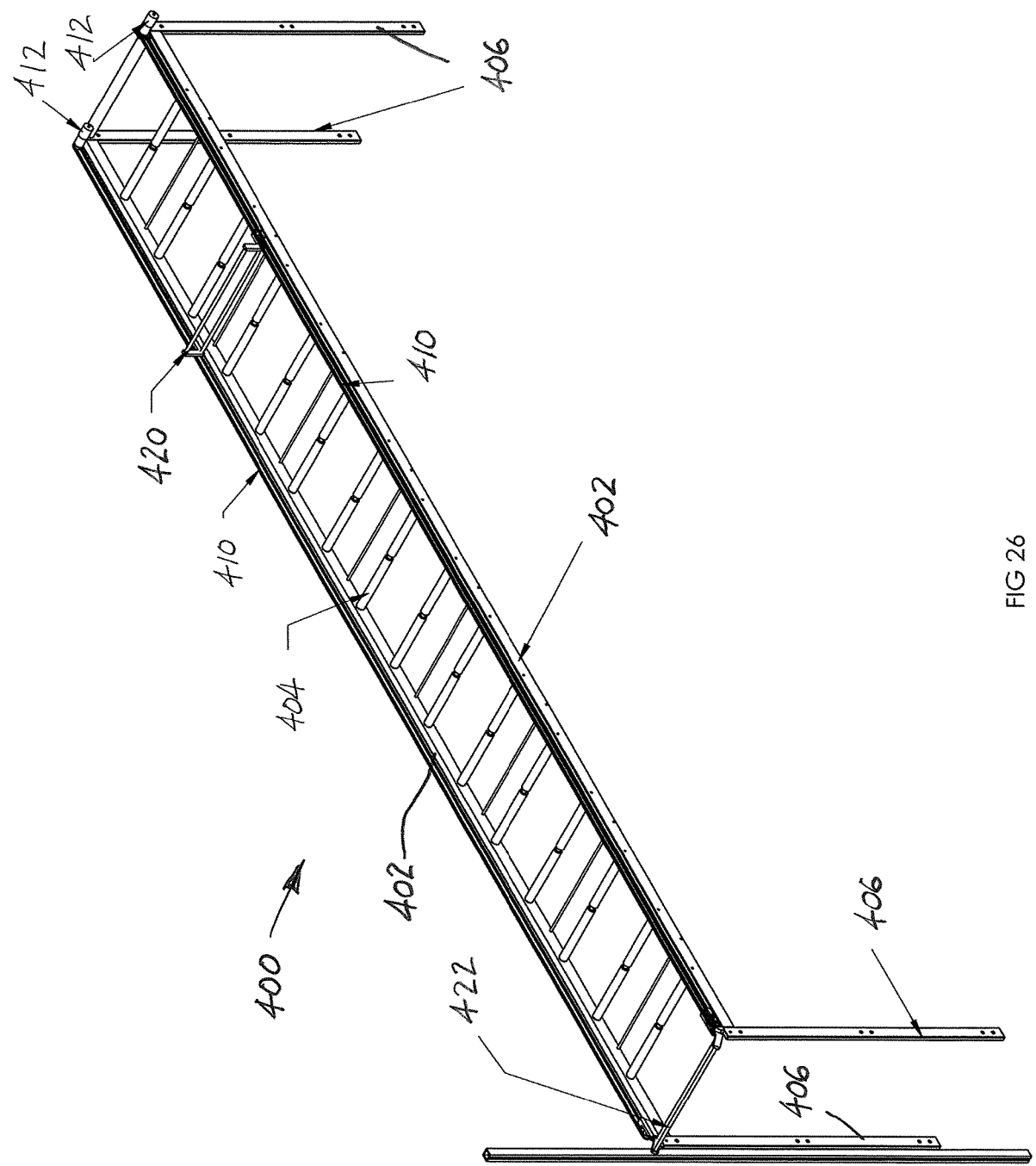
FIG. 26 is a perspective view of an alternative assembly for handling cargo insertion, storage, and removal in or from a vehicle cargo compartment.
Figure 27:
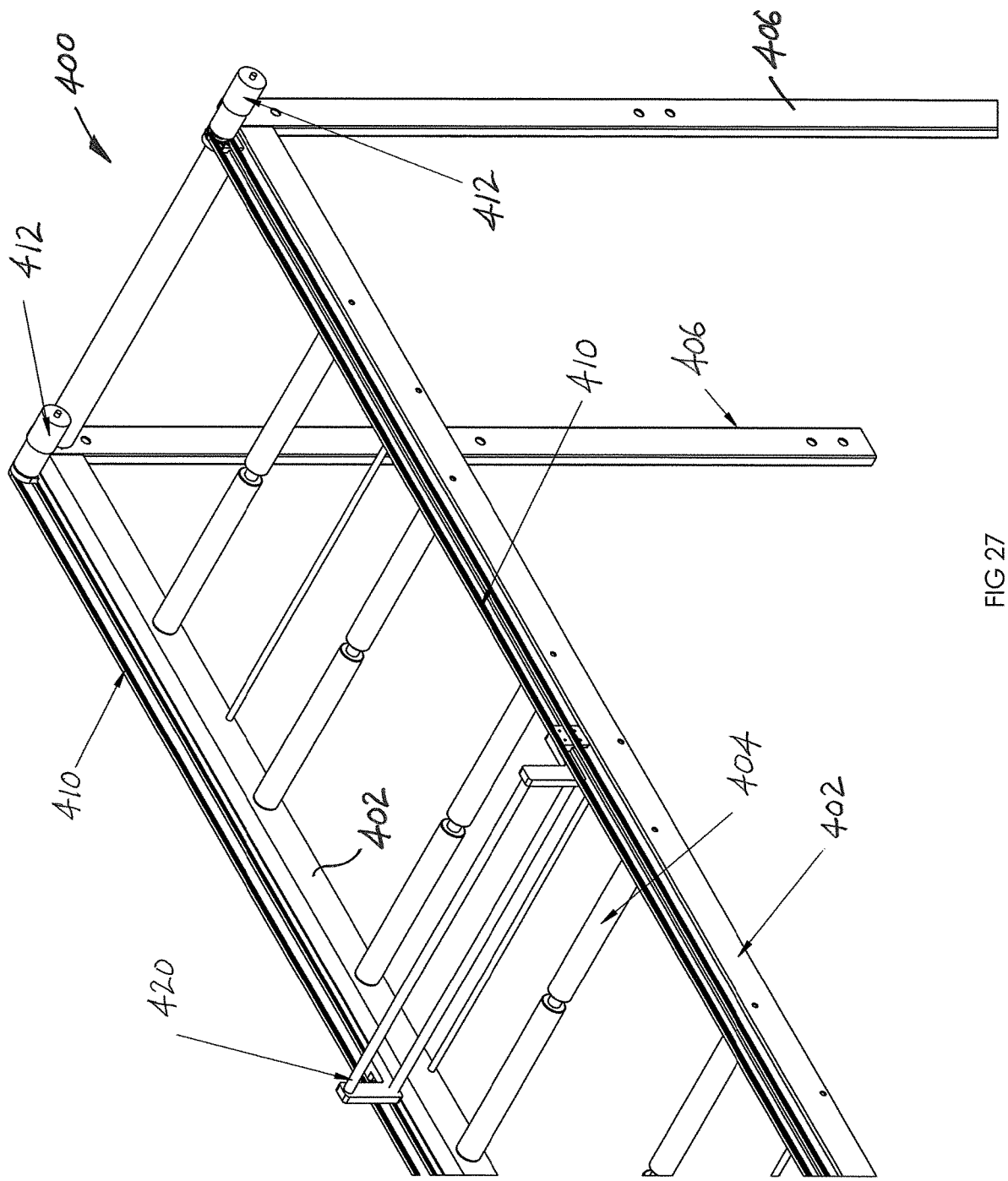
FIGS. 27 and 28 are enlarged perspective views of right-hand and left-hand portions, respectively, of the assembly shown in FIG. 26.
Figure 28:
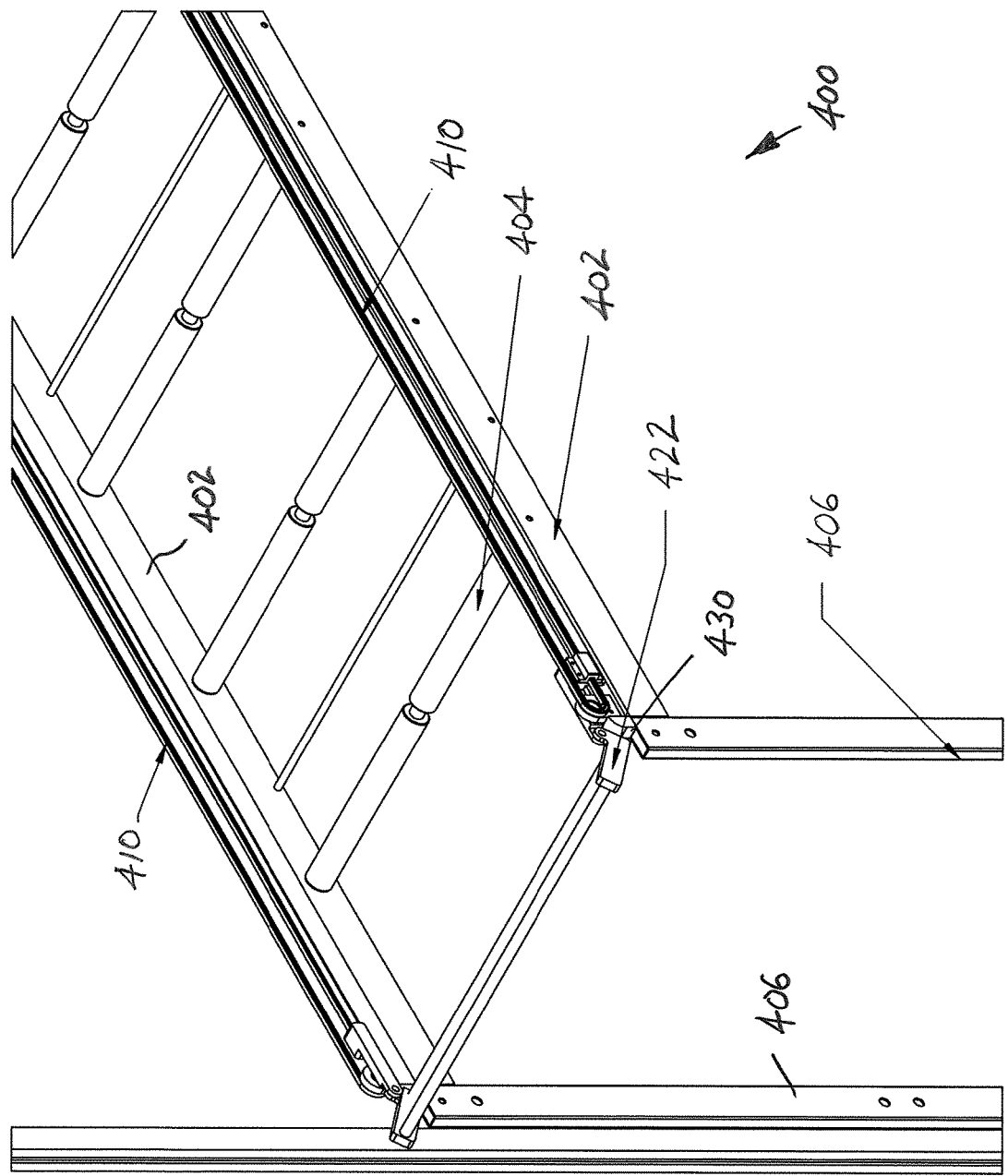

FIGS. 26-28 illustrate an alternative assembly 400 for handling cargo insertion, temporary storage during transport, and removal from a vehicle cargo compartment. This alternative storage compartment system 400 cooperates with the lift assembly 110 (not shown in FIGS. 26-28) previously described in connection with FIGS. 1-23. Particularly, the system 400 includes first and second parallel elongated support rails 402 that receive opposite ends of rollers 404 that rotate relative thereto so that cargo C can roll over the rollers and advance in and out of the truck or trailer compartment (not shown) over the rotating rollers. The support rails are supported in a horizontal position by support legs 406, for example, at least four support legs provided adjacent each end of the first and second rails. Additional support legs 406 may be provided at intermediate locations if additional support or rigidity is required.

Preferably mounted on the first and second support rails 402 are respective flexible drive members 410. In this arrangement shown in FIGS. 26-28, the flexible drive members 410 are chains, cables, belts, for example that extend in a continuous loop from the front end of the system 400 to the rear end thereof. The flexible drive members 410 ride in channels provided in the spaced apart, parallel first and second support rails, and selectively move in either clockwise or counterclockwise directions in response to a drive output from first and second motors 412, respectively. Thus, the first motor 412 drives (rotates) the first flexible drive member 410 either forwardly or rearwardly and similarly the second motor 412 drives (rotates) the second flexible drive member 410 either forwardly or rearwardly either independently or in conjunction with the first flexible drive member. A first or front fence 420 is mounted to and moved either forwardly or rearwardly by the first flexible drive member 410. Likewise, a second movable fence 422 is attached to the second flexible drive member 410. Thus, each fence 420, 422 is preferably driven along only one end/lateral side. For convenience, the fences 420, 422 are driven by the respective flexible drive member 410 located on opposite support rails 402. The first and second fences 420, 422 are arranged, positioned, or located, one in front of the cargo C (e.g., boxes) and one located behind the cargo or boxes. The first, or front fence 420 pushes cargo C out of the compartment or compartment portion and the second or rear fence 422 pushes cargo into the truck or trailer, specifically into the compartment or compartment portion of the vehicle (truck or trailer).

With suitable software instructions, the two fences 420, 422 via the drive motors 412 and flexible drive members 410 can be directed to move toward one another (or one move relative to the other) to apply a preselected compressive force that squeezes the cargo boxes together so that the cargo cannot shift forward or backwards when the vehicle accelerates or brakes. Current draw from the respective drive motors 412 is used to monitor the "amount" of compressive squeezing force being imposed on the cargo and the software directs the drive motors/flexible drive members 410 as desired. These fences 420, 422 can also work together to move the cargo C forward or backwards to position the cargo weight in an ideal or preferred position or location in the vehicle storage compartment.

Whenever the rear fence 422 moves to the back of the compartment or vehicle, the rear fence changes orientation from a vertical position (cargo engaging position) to a horizontal position (bridging position). This allows the cargo C to be pushed out by the front fence in the vertical position and the rear fence creates a bridge to the loading platform in the horizontal position. This provides a smooth transition for the cargo C from the compartment rollers of the system 400 to the loading platform 140 of the lift assembly 110. This arrangement also allows the gap or space between the end of the support rails 402 and the loading platform 140 to receive the roll-up door to operate in and fully close off access to the compartment.

The rear fence 422 is supported in the vertical position via abutment with the support rail(s) 402 similar to what is illustrated for the front fence 420 in FIG. 27. However, when the rear fence 422 reaches the end of the support rail(s) 402 adjacent the rear of the storage compartment, an upper surface of the support rail is rounded at transition portion 430 and transitions toward the lower surface of the support rail so that the longitudinal rearward movement of the rear fence transitions the orientation of the rear fence from the vertical position/cargo pushing position (FIG. 26) to the horizontal position/bridging position (shown in FIG. 28 transitioning toward the horizontal position). Vice versa, when the rear fence 422 is advanced by the flexible drive member in a longitudinal, forward direction, the rear fence moves over the rounded transition portion whereby the rear fence rotates from the horizontal bridging position (FIG. 28) to the vertical/cargo pushing position (FIG. 26).

This written description uses examples to describe the disclosure, including the best mode, and also to enable any person skilled in the art to make and use the disclosure. Other examples that occur to those skilled in the art are intended to be within the scope of the invention if they have structural elements that do not differ from the same concept or that do not differ from the literal language of the claims, or if they include equivalent structural elements with insubstantial differences from the same concept or from the literal language of the claims. Moreover, this disclosure is intended to seek protection for a combination of components and/or steps and a combination of claims as originally presented for examination, as well as seek potential protection for other combinations of components and/or steps and combinations of claims during prosecution.

Although specific advantages have been enumerated above, various embodiments may include some, none, or all of the enumerated advantages. Although exemplary embodiments are illustrated in the figures and description herein, the principles of the present disclosure may be implemented using any number of techniques, whether currently known or not. Moreover, the operations of the systems and apparatuses disclosed herein may be performed by more, fewer, or other components, and the methods described herein may include more, fewer, or other steps. Additionally, steps may be performed in any suitable order.

To aid the Patent Office and any readers of this application and any resulting patent in interpreting the claims appended hereto, applicants do not intend any of the appended claims or claim elements to invoke 35 USC 112 (f) unless the words "means for" or "step for" are explicitly used in the particular claim.

What is claimed is:

1. A cargo loading or unloading system for a delivery vehicle, the system comprising:
    a storage compartment of an associated vehicle that stores associated cargo received from or delivered through an opening to the storage compartment, wherein said storage compartment comprises at least a two high by two wide array of compartment portions;
    a storage compartment system including a compartment portion conveyor located in each compartment portion configured to assist in the delivery or receipt of the associated cargo from or into the compartment portion;
    a lift assembly movably mounted to the storage compartment and configured to receive associated cargo from the respective compartment portion conveyor, the lift assembly including a lift assembly conveyor that receives associated cargo from or delivers associated cargo to a compartment portion, the lift assembly includes a platform that receives associated cargo from or delivers associated cargo to one of the compartment portions; and
    a mounting assembly that movably secures the lift assembly to the storage compartment, the mounting assembly including first and second vertical guide members positioned at horizontally spaced locations of the storage compartment, and first and second horizontal guide members at vertically spaced locations that each includes first and second ends that are interconnected to the vertical guide members and movable vertically relative thereto, the platform secured to the first and second horizontal guide members and movable laterally there along between the first and second vertical guide members whereby the platform can be positioned at a selected compartment portion of the array of compartment portions by movement of the first and second horizontal guide members vertically relative to the first and second vertical guide members and movement of the platform laterally along with first and second horizontal guide members.

2. The system of claim 1 wherein the platform has a first edge pivotally mounted to the second horizontal guide member whereby the platform is movable between a first, vertical storage position and a second, horizontal deployed position.

3. The system of claim 2 further comprising at least one linkage assembly that includes first and second links, a first end of the first link secured to the first horizontal guide member and a first end of the second link secured to a second edge of the platform, and second ends of the first and second links hingedly connected to one another.

4. The system of claim 1 wherein the mounting assembly is dimensioned so that the platform can move to a location below the compartment portions for delivery of associated cargo to a ground surface.

5. The system of claim 2 wherein the lift assembly conveyor is operatively associated with the platform, and wherein the lift assembly conveyor includes first and second conveyor portions separated by a gap, and a pusher bar that extends through the gap and configured to engage the associated cargo received on the platform and facilitate movement of a first associated cargo component relative to a second associated cargo component.

6. A cargo loading or unloading system for a delivery vehicle, the system comprising:
    a storage compartment of an associated vehicle that stores associated cargo received from or delivered through an opening to the storage compartment, wherein the storage compartment comprises an array of compartment portions;
    a storage compartment system located in each compartment portion configured to assist in the delivery or receipt of the associated cargo from or into the compartment portion;
    a lift assembly movably mounted to the storage compartment and configured to receive associated cargo from a compartment portion, the lift assembly including a lift assembly conveyor that receives associated cargo from or delivers associated cargo to a compartment portion, the lift assembly includes a platform that receives associated cargo from or delivers associated cargo to one of the compartment portions; and
    a mounting assembly that movably secures the lift assembly to the storage compartment, the mounting assembly including first and second vertical guide members positioned at horizontally spaced locations of the storage compartment, and first and second horizontal guide members at vertically spaced locations that each includes first and second ends that are interconnected to the vertical guide members and movable vertically relative thereto, the platform secured to the first and second horizontal guide members and movable there along between the first and second vertical guide members whereby the platform can be positioned at a selected compartment portion of the array;

wherein the lift assembly conveyor is operatively associated with the platform; and wherein the lift assembly conveyor includes first and second conveyor portions separated by a gap, and a pusher bar that extends through the gap and configured to engage the associated cargo received on the platform and facilitate movement of a first associated cargo component relative to a second associated cargo component.

7. The system of claim 6 wherein the pusher bar is weighted and mounted to the platform to extend above a belt surface of the first and second conveyor portions during a first portion of a path of the conveyor portions, and is located below the belt surface during a second portion of the path of the conveyor portions.

8. The system of claim 1 further comprising a sensor for monitoring movement of the associated cargo from the compartment portion conveyor to the lift assembly conveyor.

9. The system of claim 8 further comprising a first motor operatively associated with the compartment portion conveyor of at least one of the compartment portions, and a second motor operatively associated with the lift assembly conveyor, and a controller communicating with the lift assembly, the mounting assembly, the sensor, the first motor, and the second motor that deploys and stores the platform, moves the platform among the compartment portions and below the compartment portions, monitors a position of a first associated cargo to an adjacent second associated cargo and in response to a space between the first and second associated cargoes terminates movement of the compartment portion conveyor to separate the first and second associated cargoes on to the lift assembly conveyor.

10. The system of claim 1 wherein the conveyor of each compartment portion includes rollers supported by support rails on opposite ends thereof, at least a first fence for pushing associated cargo over the rollers into or out of the compartment, and at least a second fence for pushing associated cargo over the rollers into or out of the compartment.

11. The system of claim 10 wherein at least one of the support rails includes a transition portion that operatively engages a second fence to re-orient the second fence between a vertical, cargo pushing position and a horizontal, bridging position.

12. The system of claim 10 wherein the first and second fences are operatively connected respectively to first and second independently controllable fence motors such that operation of the first and second fence motors can be used to impose a squeezing action on associated cargo received on the rollers between the first and second fences.

13. The system of claim 12 wherein once the associated cargo is squeezed between the first and second fences, the first and second fence motors can work together to reposition the cargo forwardly or rearwardly in the compartment.

14. The system of claim 1 further comprising a lever that selectively engages an edge of the platform to impose a torque thereon and pivot the platform from a horizontal, deployed position to a vertical, stored position.

15. A process for loading or unloading associated cargo to or from an associated delivery vehicle that includes storage compartment comprising an array of at least two high by two wide compartment portions dimensioned to receive cargo there in, a first motor operatively associated with a conveyor of at least one of the compartment portions, and a lift assembly having a platform with a lift assembly conveyor where the lift assembly is secured via a mounting assembly to the storage compartment, a sensor, a second motor operatively associated with the lift assembly conveyor, and a controller communicating with the lift assembly, the mounting assembly, the sensor, the first motor operatively associated with the compartment portions and the second motor operatively associated with the lift assembly conveyor, the process comprising:

deploying and storing the platform;

moving the platform vertically and horizontally among the array of compartment portions; and transferring the associated cargo from a compartment portion to the platform, and/or to a ground surface.

16. The process of claim 15 wherein the transferring step includes moving the associated cargo from the compartment portions to the ground surface at a location below the compartment portions.

17. The process of claim 15 including sensing a position of the associated cargo during the transferring step and operating the compartment portion conveyor and the lift assembly conveyor to separate first and second associated cargo components.

18. The process of claim 15 wherein the moving step includes raising and lowering the platform between vertically offset compartment portions, and/or laterally moving the platform between horizontally offset compartment portions.

19. The process of claim 15 further comprising moving the platform between a storage position and a deployed position.

20. The process of claim 19 wherein the platform moving step includes pivoting the platform between a vertical orientation that defines the storage position and a horizontal orientation that defines the deployed position.

21. The process of claim 15 wherein the system further includes a door, and further comprising opening and closing the door to selectively access the storage compartment.

22. A process for loading or unloading associated cargo to or from an associated delivery vehicle that includes storage compartment having compartment portions dimensioned to receive cargo there in, a first motor operatively associated with a conveyor of at least one of the compartment portions, and a lift assembly having a platform with a lift assembly conveyor where the lift assembly is secured via a mounting assembly to the storage compartment, a sensor, a second motor operatively associated with the lift assembly conveyor, and a controller communicating with the lift assembly, the mounting assembly, the sensor, the first motor operatively associated with the compartment portions and the second motor operatively associated with the lift assembly conveyor, the process comprising:

deploying and storing the platform;

moving the platform among the compartment portions; and transferring the associated cargo from a compartment portion to the platform, and/or to a ground surface;

wherein the lift assembly conveyor is operated at a faster speed than the compartment portion conveyor to separate a first associated cargo from an adjacent second cargo.

23. A process for loading or unloading associated cargo to or from an associated delivery vehicle that includes storage compartment having compartment portions dimensioned to receive cargo there in, a first motor operatively associated with a conveyor of at least one of the compartment portions, and a lift assembly having a platform with a lift assembly conveyor where the lift assembly is secured via a mounting assembly to the storage compartment, a sensor, a second motor operatively associated with the lift assembly conveyor, and a controller communicating with the lift assembly, the mounting assembly, the sensor, the first motor operatively associated with the compartment portions and the second motor operatively associated with the lift assembly conveyor, the process comprising:

deploying and storing the platform;

moving the platform among the compartment portions; and transferring the associated cargo from a compartment portion to the platform, and/or to a ground surface;

wherein the lift assembly conveyor includes first and second conveyor portions separated by a gap, and a pusher bar, the process further including engaging associated cargo with the pusher bar to assist with movement of the associated cargo received on the lift assembly conveyor.

24. The process of claim 23 further comprising positioning the pusher bar between the first and second conveyor portions.

25. The process of claim 23 further comprising extending the pusher bar outwardly from surfaces of the first and second conveyor portions during a first portion of movement of the conveyor portions, and the pusher bar not extending outwardly from the surfaces of the first and second conveyor portions during a first portion of movement of the conveyor portions.

26. The process of claim 15 wherein the storage compartment conveyor includes rollers supported by support rails on opposite ends thereof, and at least a first fence, and the process including pushing associated cargo over the rollers into or out of the compartment with the first fence.

27. The system of claim 26 wherein the storage compartment conveyor further comprises a second fence, and the process includes pushing associated cargo over the rollers into or out of the compartment.

28. The system of claim 27 wherein the storage compartment system includes first and second motors, and first and second flexible drive members connected, respectively, thereto that are connected to the first and second fences, respectively, and driving the first and second fences independently of each other.

29. The system of claim 28 further including selectively re-orienting the second fence between a vertical, cargo pushing position and a horizontal, bridging position.

30. A process for loading or unloading associated cargo to or from an associated delivery vehicle that includes storage compartment having compartment portions dimensioned to receive cargo there in, a first motor operatively associated with a conveyor of at least one of the compartment portions, and a lift assembly having a platform with a lift assembly conveyor where the lift assembly is secured via a mounting assembly to the storage compartment, a sensor, a second motor operatively associated with the lift assembly conveyor, and a controller communicating with the lift assembly, the mounting assembly, the sensor, the first motor operatively associated with the compartment portions and the second motor operatively associated with the lift assembly conveyor, the process comprising:

deploying and storing the platform;

moving the platform among the compartment portions; and transferring the associated cargo from a compartment portion to the platform, and/or to a ground surface;

wherein the storage compartment conveyor includes rollers supported by support rails on opposite ends thereof, and at least first and second fences, and the process comprises pushing associated cargo over the rollers into or out of the compartment with the first fence;

said process further comprising independently driving the first and second fences for independent movement of the first and second fences relative to each other.

31. The system of claim 30 further comprising moving the first and second fences relative to each other such that the first and second fences impose a squeezing action on associated cargo received on the rollers between the first and second fences.

32. The system of claim 31 further comprising repositioning the associated cargo forwardly or rearwardly in the compartment by moving the first and second fences once the associated cargo is squeezed between the first and second fences.

\* \* \* \* \*

UNITED STATES PATENT AND TRADEMARK OFFICE
CERTIFICATE OF CORRECTION

| | | |
|---|---|---|
| PATENT NO. | : 12,195,275 B2 | Page 1 of 1 |
| APPLICATION NO. | : 17/608560 | |
| DATED | : January 14, 2025 | |
| INVENTOR(S) | : Paul G. Eidsmore | |

It is certified that error appears in the above-identified patent and that said Letters Patent is hereby corrected as shown below:

In the Claims

Column 14, Claim 1, Line 37, "along with first" should read -- along the first --

Signed and Sealed this
Fifteenth Day of April, 2025

Coke Morgan Stewart
*Acting Director of the United States Patent and Trademark Office*